US007000570B2

(12) United States Patent
Napolez et al.

(10) Patent No.: US 7,000,570 B2
(45) Date of Patent: Feb. 21, 2006

(54) SYNCHRONIZED PRIMARY WINDING CURRENT SHUNTING TECHNIQUE FOR CONTROLLING ELECTRO-STIMULUS LEVEL

(75) Inventors: Francisco J. Napolez, Tucson, AZ (US); Timothy T. Duncan, Tucson, AZ (US); Timothy J. Crist, Tucson, AZ (US); Kagum G. Zakharyan, Tucson, AZ (US)

(73) Assignee: Tri-Tronics, Inc., Tucson, AZ (US)

( * ) Notice: Subject to any disclaimer, the term of this patent is extended or adjusted under 35 U.S.C. 154(b) by 215 days.

(21) Appl. No.: 10/753,009

(22) Filed: Jan. 7, 2004

(65) Prior Publication Data

US 2005/0145199 A1 Jul. 7, 2005

(51) Int. Cl.
*A01K 15/02* (2006.01)
*A01K 15/04* (2006.01)

(52) U.S. Cl. ....................... 119/718; 119/719; 119/721; 340/573.3

(58) Field of Classification Search ................ 119/718, 119/719, 720, 721, 905, 908; 340/573.1, 340/573.2, 573.3, 573.4
See application file for complete search history.

(56) References Cited

U.S. PATENT DOCUMENTS

| | | | | |
|---|---|---|---|---|
| 4,802,482 | A | 2/1989 | Gonda et al. | 119/29 |
| 4,947,795 | A | 8/1990 | Farkas | 119/29 |
| 5,617,814 | A * | 4/1997 | Bianco et al. | 119/720 |
| 5,640,932 | A * | 6/1997 | Bianco et al. | 119/720 |
| 5,682,839 | A * | 11/1997 | Grimsley et al. | 119/721 |
| 6,459,378 | B1 * | 10/2002 | Gerig | 340/573.3 |
| 6,722,318 | B1 * | 4/2004 | Hotmer | 119/712 |
| 6,838,991 | B1 * | 1/2005 | Frankewich, Jr. | 340/573.1 |

* cited by examiner

*Primary Examiner*—Yvonne R. Abbott
(74) *Attorney, Agent, or Firm*—Cahill, von Hellens & Glazer P.L.C.

(57) ABSTRACT

An electronic apparatus (1) for training an animal is supported against the animal's skin, and includes stimulus electrodes (5) for electrically contacting the skin. A controller including output terminals producing aversive stimulus control signals, a first switch (Q4) coupled to a winding to produce therein a burst of first current pulses in response to a first signal produced by the controller (33) and a second switch (Q2) coupled to the first switch (Q4) operative to synchronously shunt predetermined trailing portions of the first current pulses away from the winding in response to a second signal produced by the controller to reduce the amount of energy delivered to the winding by the switching transistor (Q4) without substantially changing a peak value of a flyback voltage across the winding. The controller sets various values of time intervals during which portions of the first current pulses are shunted away from the winding in order to set various corresponding intensities of aversive stimulus.

24 Claims, 14 Drawing Sheets

SYNCHRONIZED PRIMARY WINDING CURRENT SHUNTING TECHNIQUE FOR CONTROLLING ELECTRO-STIMULUS LEVEL

BACKGROUND OF THE INVENTION

The present invention relates generally to electronic remote training collars and the like and also to collar-mounted electronic "bark limiter" or dog bark training devices, and more particularly to improvements therein which reduce the size, weight and power consumption thereof without reducing the open circuit stimulus voltage, allow convenient manual adjusting of stimulus levels, provide improved sensing of what constitutes valid barking, provide low-power standby operation when the dog is not barking, and allow monitoring of the amount of valid barking that actually occurs.

A variety of electronic dog training collars have been utilized for applying electrical shock and/or audible stimulus to a dog when it barks. In many situations it is highly desirable to prevent individual dogs or groups of dogs from barking excessively. For example, one dog's barking in a kennel is likely to stimulate other dogs to bark. This is undesirable with respect to the welfare of the dogs themselves and nearby people. Similar problems occur in neighborhoods in which there are dogs that are kept outside at night: if one dog starts barking others are likely to join in, causing a general disturbance.

The closest prior art is believed to include the present assignee's Bark Limiter product and commonly assigned U.S. Pat. No. 4,947,795 by G. Farkas entitled "Barking Control Device and Method", issued Aug. 14, 1990 and incorporated herein by reference. U.S. Pat. No. 4,947,795 discloses a bark training device which allows a dog to control the level of electrical stimulus in response to its own barking behavior. This patent discloses circuitry in a collar-mounted electrical device that detects the onset of barking and initially produces only a single low level electrical stimulus pulse that gets the dog's attention, but does not initially produce a highly unpleasant level of stimulation. If the dog continues barking, the stimulation levels of the electrical shock pulses are increased at the onset of each barking episode in a stepwise fashion until the stimulus becomes so unpleasant that the dog stops barking for at least a predetermined time, e.g., one minute. After that minute elapses, the circuitry resets itself to its lowest initial stimultion level and remains inactive until barking begins again, and then repeats the process, beginning with the lowest level of stimulation and increasing the stimulus level if barking continues. In one embodiment, a certain duration, e.g., 30 seconds, of "watchdog barking" is permitted before the initial stimulus pulse is applied to get the dog's attention, after which continued "nuisance barking" results in gradual increasing in the intensity of the aversive stimulus up to a maximum level until the barking stops for at least one minute. However, the assignee's above mentioned Bark Limiter product does not use the algorithm described in U.S. Pat. No. 4,947,795 for producing increased stimulation in response to increased levels of barking, and instead provides a fixed duration stimulation with detection of an initial onset of barking, and provides a half second duration of stimulation with two seconds of pause, which is easily implemented and has been proven to be very effective.

The Tri-Tronics collar-mounted Bark Limiter product has been successfully marketed by the present assignee for many years. It has been very successful in the market because it effectively controls unwanted barking of large and medium-sized dogs. Its large size has allowed use of large batteries to power the circuitry that allows the Bark Limiter product to produce a substantial level of stimulation, which has been a major reason for the product's success. However, the large size and weight of the assignee's Bark Limiter product have limited it to use on medium-sized and large-sized dogs. Competitive products that have been smaller in size and weight and therefore have been usable on a small or tiny dogs have been introduced to the market, but their small size evidently has necessitated a substantial reduction in the level of stimulation that such products can produce in response to the dog's barking.

For many years, the present assignee has designed and marketed collar-mounted electronic dog training products which endeavor to keep the open circuit output voltage between the two stimulation electrodes at a high level in order to establish good electrode contact despite less than perfect electrical contact between the electrode contact area of one or both of the electrodes and the skin of the dog. This is explained, for example, in the assignee's U.S. Pat. No. 4,802,482 entitled "Method and Apparatus for Remote Control of Animal Training Stimulus" by Gonda et al., issued Feb. 7, 1989 and incorporated herein by reference.

Some of the assignee's prior collar-mounted dog training products have varied the intensity of electrical stimulation applied to the dog's neck by changing the widths of the current pulses driven through the primary winding of the output transformer. This causes the peak open circuit voltage produced between the stimulus electrodes driven by the secondary winding of the output transformer to vary as a function of the selected/desired stimulus intensity, and sometimes results in undesirably low open circuit voltages between the stimulus electrodes transformer.

A problem of the prior art has been that the effectiveness of coupling the electro-stimulus energy to the dog is reduced as the amount of RMS energy applied to the primary winding of the output transformer is reduced in order to reduce the stimulus intensity level. This reduces the reliability of the electrical contact between the stimulus electrodes and the skin of the dog's neck, and thereby reduces the effectiveness of the training or even causes the training to become counterproductive, and leads to over-tightening of collar straps by dog trainers and/or owners, which often causes chronic sores on the dog's neck.

Users of collar-mounted bark training products generally wish to be able to test such products by demonstrating their operability in response to a suitable sound or simulated bark signal. The assignee's prior Bark Limiter product has utilized test lights and an external tester that actuates its barking sound vibration sensor. Some of the prior art bark limiters have vibration sensors such as electret condenser microphones built into their housings between the stimulus electrodes. External buzzers have been used to stimulate the vibration sensor in order to test it and determine if the bark limiter is operative.

A shortcoming of the prior art bark training products is that they detect nearly any sound the dog makes and automatically shock the dog in response to the detected sound. The stimulation intensity can be changed only by removing the stimulation electrodes and replacing them with different stimulation electrodes having different series resistances. The battery life of some prior bark limiters has been undesirably short, especially because dog owners often find it convenient to leave the devices in a "power on" condition for long periods of time, even when the dog is not likely to be barking.

Another shortcoming of the larger prior art bark control devices is that they are too large to use on a small or tiny dog.

Yet another shortcoming of prior bark control devices is that occasionally when the dog scratches with its hind foot, it unintentionally contacts the power switch and turns off the power of the bark control device. The dog may learn that by "scratching" in a certain way it can turn the bark control device off.

Thus, there is an unmet need for an improved animal training device that provides a way of conveniently adjusting the level of the stimulation intensity applied to the animal.

There also is an unmet need for an improved animal training or bark control device that enables a user to readily determine which of various possible stimulation levels is presently selected.

There also is an unmet need for a small, lightweight electro-stimulus animal training device that despite its small size is nevertheless capable of providing a substantially larger open circuit output voltage that the prior small, lightweight electro-stimulus animal training devices.

There also is an unmet need for a small, lightweight bark control device that provides high open circuit output voltage over a wide range of low to high applied electrical stimulus levels.

There also is an unmet need for way of substantially reducing the power consumption of a animal training device.

There also is an unmet need for a small, lightweight, highly effective bark control device that is small and light enough to be readily worn by a small or tiny dog.

There also is an unmet need for an improved bark control device that avoids accidental stimulation of the dog in the event that the battery voltage is too low.

There also is an unmet need for an improved bark control device that cannot be accidentally or deliberately turned off by a dog's scratching activity.

There also is an unmet need for an improved collar-mounted animal training device that substantially reduces the occurrence and/or severity of neck sores on the animal wearing the device.

SUMMARY OF THE INVENTION

Accordingly, it is an object of the invention to provide an improved animal training device that provides a way of conveniently adjusting the level of the stimulation intensity applied to the animal.

It is another object of the invention to provide a small, lightweight animal training device that despite its small size is nevertheless capable of providing large open circuit output voltage.

It is another object of the invention to provide a small, lightweight bark control device that provides high open circuit output voltage for a wide range of low to high electrical stimulus levels.

It is another object of the invention to provide a way of substantially reducing the power consumption of an animal training device.

It is another object of the invention to provide a small, lightweight, highly effective bark control device that can be worn by a small or tiny dog.

It is another object of the invention to provide an improved collar-mounted animal training device that substantially reduces the occurrence and/or severity of neck sores on the animal wearing the device.

It is another object of invention to provide an improved low power consumption bark control device including a switch and LED indicator arrangement that minimizes the possibility of water leakage into the housing of the bark control device.

It is another object of the invention to provide an improved bark control device that cannot be accidentally or deliberately turned off by a dog's scratching activity.

It is another object of the invention to provide an improved bark control device that avoids accidental stimulation of the dog caused by improper operation due to the battery voltage being too low.

Briefly described, and in accordance with one embodiment, the present invention provides an electronic apparatus (1) for training an animal, including a housing (2) supported against the animal's skin by a strap, first and second stimulus electrodes (5) extending from a surface (9) of the housing, a controller (33) in the housing having output terminals producing aversive stimulus control signals, first switch (Q4) coupled to a winding to produce a burst of first current pulses in a winding in response to a first signal produced by the controller (33) and a second switch (Q2) coupled to the first switch (Q4) operative to synchronously shunt predetermined trailing portions of the first current pulses away from the winding in response to a second signal produced by the controller to reduce the amount of energy delivered to the winding by the switching transistor (Q4) without substantially changing a peak value of a flyback voltage across the winding, the second signal including a burst of pulses synchronous with the burst of first current pulses. In the described embodiment, the winding is the primary winding of an output transformer having a secondary winding coupled between the first and second stimulus electrodes.

In the described embodiment, the controller executes a program to set various values of time intervals during which predetermined portions of the first current pulses are shunted away from the winding in order to set various corresponding intensities of aversive stimulus applied between the first and second stimulus electrodes. The controller sequentially increments values of the time intervals in response to sequential actuation of a single manual switch (17).

In one embodiment, the invention provides a collar-mounted electronic apparatus (1) for control of barking by a dog, including a housing (2) supported by a collar for attachment to the dog's neck, first and second stimulus electrodes (5) connected to a top surface (9) of the housing, a vibration sensor (6) supported by the housing for detecting vibrations caused by barking by the dog, a controller (33) in the housing having an input coupled to an output of the vibration sensor, the controller including output terminals producing aversive stimulus control signals in response to barking by the dog wherein a switching transistor (Q4) is coupled to a winding of an output transformer (42) to produce a burst of first current pulses in the winding in response to a first signal produced by the controller (33) and a shunt transistor (Q2) is coupled to the switching transistor (Q4) to synchronously shunt predetermined trailing portions of the first current pulses away from the winding in response to a second signal produced by the controller to reduce the amount of energy delivered to the winding by the switching transistor (Q4) without substantially changing a peak value of a flyback voltage across the winding. The second signal includes a burst of pulses synchronous with the burst of first current pulses. The second signal synchronously turns the shunt transistor (Q2) on during a trailing portion of each first current pulse after a peak of the flyback voltage produced in response to the first current pulse, so the open circuit stimulus voltage produced between the first and second stimulus electrodes is relatively independent of the level of the first stimulation selected by means of a manual switch coupled to the controller. The controller sequentially sets desired stimulus intensity levels in response to sequential actuation of the membrane switch, causing the controller to also sequentially turned on, one at a time, selected stimulus intensity indicating light emitting diodes (10) visible through a sidewall of the housing. The controller operates to produce a delay in a leading edge of each pulse of the second signal in accordance with the selected desired stimulus intensity level in order to control the actual aversive stimulus intensity level.

In the described embodiment, the housing includes translucent material, and the collar-mounted electronic apparatus includes a reflector (20) disposed within the housing behind a plurality of stimulus intensity indicating light emitting diodes (10) to reflect and thereby intensify light emitted by the stimulus intensity indicating light emitting diodes and impinging on the housing so that light emitted by each stimulus intensity indicating light emitting diode passes through the housing and is easily visible from outside the housing.

In the described embodiment, the electronic apparatus includes neck motion sensing means coupled to the controller for enabling the controller to produce the first and second signals in response to a characteristic neck commotion of the dog during barking.

In the described embodiment, the electronic apparatus includes valid bark determination means in the controller for producing a frequency spectrum of vocalization by the dog and comparing the frequency spectrum with a predetermined valid bark frequency spectrum to determine if the vocalization constitutes a valid barking episode. The described embodiment of the electronic apparatus also includes means in the controller for establishing a low-power sleep mode during an interval of time during which no characteristic motion of the dog's neck is detected by the neck motion sensing means.

BRIEF DESCRIPTION OF THE DRAWINGS

FIGS. 6-1 and 6-2 are a schematic diagram of the circuitry included in the housing of the bark limiter of FIG. 1.

FIGS. 8-1 and 8-2 are a block diagram of the microcontroller 33 shown in FIGS. 6-1 and 6-2.

DETAILED DESCRIPTION OF THE PREFERRED EMBODIMENTS

To summarize, a preferred embodiment of a dog bark limiter of the present invention provides convenient manual adjustability of the applied stimulus level to be applied to the neck of the dog by means of a switch. The bark limiter also includes low power circuitry that improves the electrical stimulation scheme to provide adequately high open circuit voltage between the stimulus electrodes in a small, lightweight collar-mounted animal training product at both high and low selected stimulus levels. The described bark limiter includes a motion detector that detects characteristic motion of the dog's neck produced as a result of barking and in response automatically powers up the circuitry from a very low power stand by operating condition.

A technique of "valid" bark detection using software wherein a capture and compare routine is executed in software executed by a microcontroller to accomplish the function of, in effect, generating a frequency spectrum of the received sound and comparing it with a predetermined frequency spectrum to determine if the sound constitutes a "valid" bark. A "bark counter" function is provided that counts the number of valid barking episodes by the dog. A self-test mode is provided to self-test or verify operability of the neck motion sensor and the sound vibration sensor. Whenever an electrical stimulus is applied to the dog's neck, then a 4 second "relaxation" delay is allowed to elapse before any further stimulus can be applied, in order to prevent a stimulus-caused barking cycle from being established.

Figure 1:
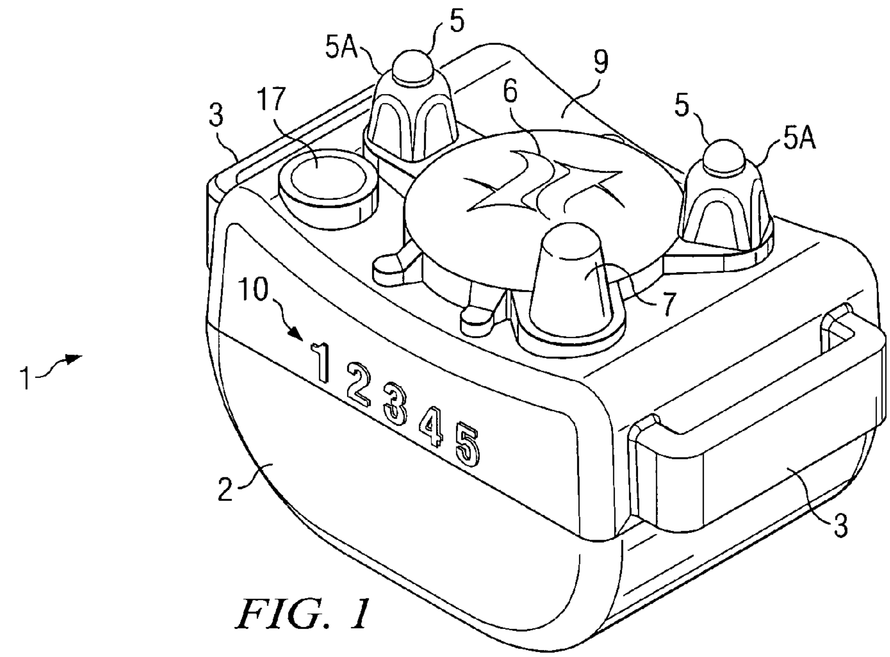
FIG. 1 is a perspective view of a collar-mounted bark limiter unit of the present invention with the collar removed.
Figure 2:
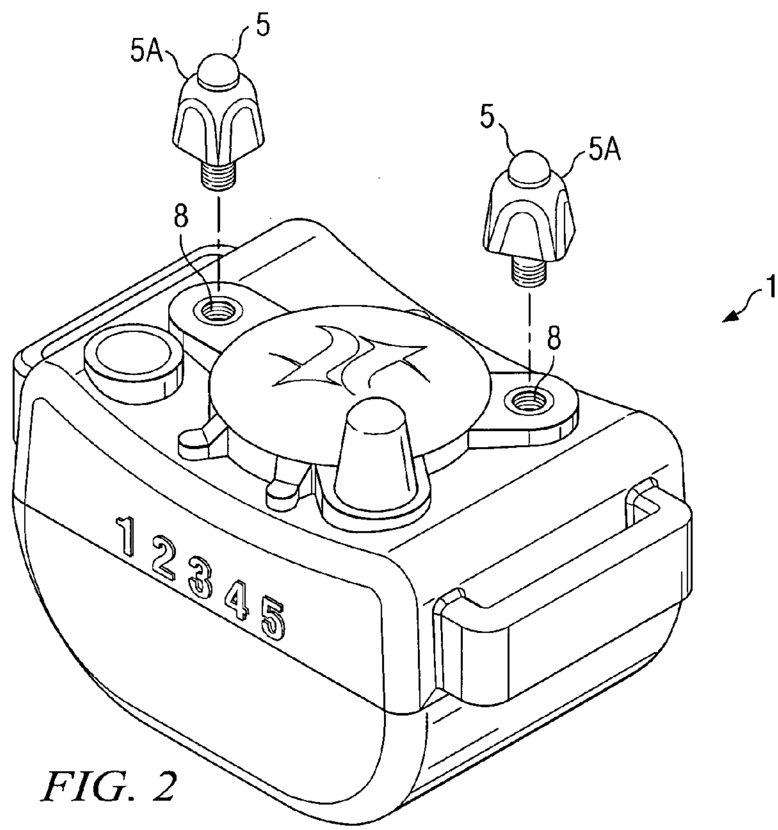
FIG. 2 shows the a partially-exploded view of the bark limiter unit of FIG. 1.

Referring to FIGS. 1, 2, 3A and 3B, bark limiter 1 includes a housing 2 having a lower section 2A and an upper section 2B. The top surface 9 of upper housing section 2B is slightly concave, to better accommodate the curvature of a dog's neck. A pair of collar-retaining loops 3 are attached to opposite ends of upper housing section 2B, as shown. A typical dog collar (not shown) is passed through loops 3 around the bottom surface of housing 2 to fasten bark limiter 1 to the dog's neck. Two stimulus electrodes 5 are threaded into receiving holes 8 (FIG. 2) in the upper surface 9, and their conductive tips are pressed against the dog's neck to make electrical contact therewith when the collar is tightened. As indicated in FIG. 2, stimulus electrodes 5 are removable. In accordance with one aspect of the present invention, a preferably non-conductive stabilizing post of the same height as stimulus electrodes 5 is rigidly attached to upper surface 9, and is offset from a straight line between stimulus electrodes 5 so the stabilizing post 7 and the two stimulus electrodes 5 define a triangle. This prevents the conductive electrode tips of stimulus electrodes 5 from "rocking" against the dog's neck and avoids or at least reduces the occurrence and severity of sores on the dog's neck that are sometimes caused by the pressure of the stimulus electrodes against the dog's skin. The stabilizing post 7 in conjunction with the stimulus electrodes 5B and 5C provides stable contact of all three with the dog's neck and allows the direction of the collar to be reversed so that stabilizing post 7 and stimulus electrodes 5B and 5C make contact with different areas on the dog's neck, which reduces the occurrence and of and severity of neck sores.

A dome-shaped membrane 6 that preferably is integrally formed with the upper housing section 2B is disposed on upper surface 9 and constitutes part of an improved vibration sensor 30, which is subsequently described in more detail with reference to FIG. 5. A membrane switch 17 extends through an opening in upper surface 9. The dog owner can repetitively depress membrane switch 17 to select one of five stimulus intensity levels. The selected intensity level is indicated by illumination of one of the five indicators identified by reference numeral 10. Membrane switch 17 also can be depressed for a 4 second interval to set bark limiter 1 to a test mode, subsequently described. The above features, except the stimulus electrodes 5B and 5C, on the upper surface 9 of upper housing 2B are all integrally formed as a single unit.

Figure 3A:
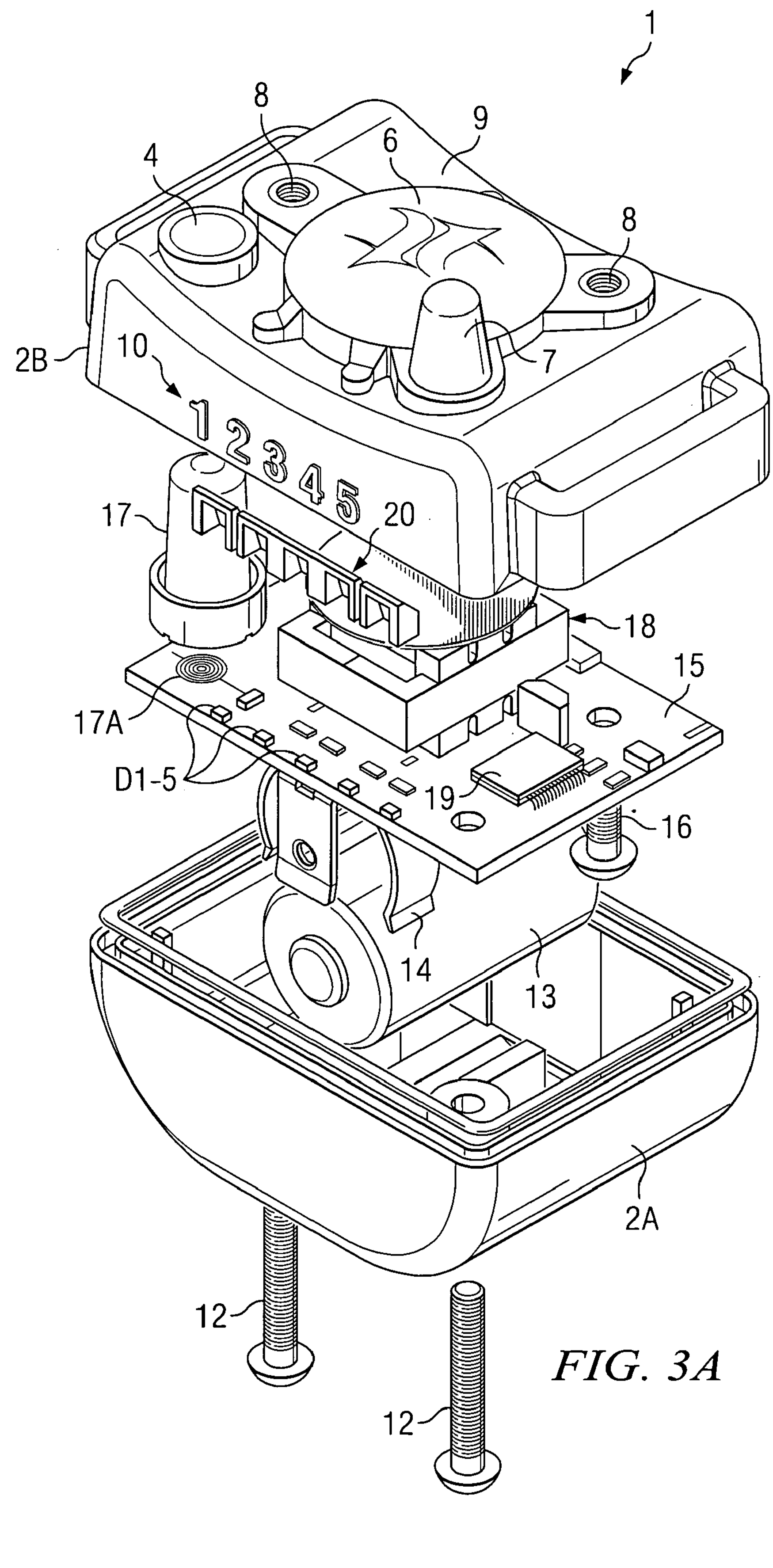
FIG. 3A is a perspective exploded view of the bark limiter unit of FIGS. 1 and 2.
Figure 3B:
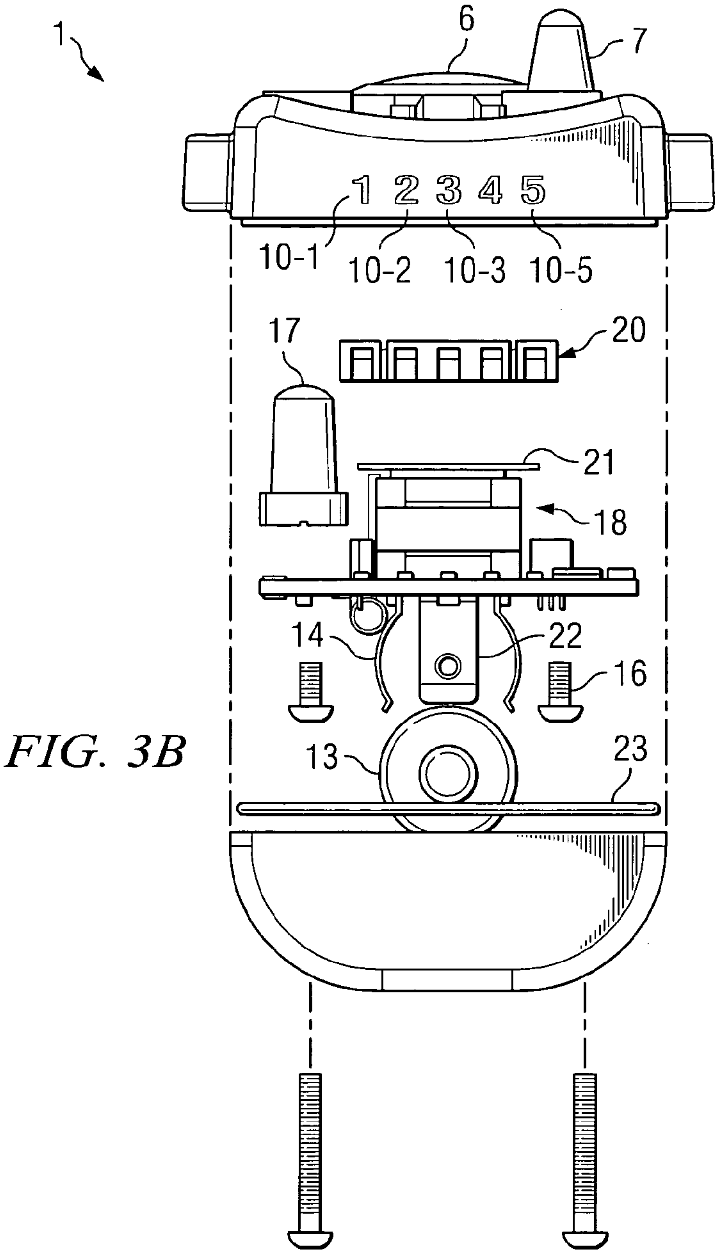
FIG. 3B is a side exploded view of the bark limiter unit as shown in FIG. 3A.

Referring to the exploded views of FIGS. 3A and 3B, lower housing section 2A is attached to upper housing section 2B by means of two screws 12. A printed circuit board 15A contained within housing 2 is attached to upper housing section 2B by means of two screws 16. A 3 volt lithium battery 13 is attached to the bottom of printed circuit board 15A by means of a pair of clips 14. The membrane switch unit 17 is attached to the upper surface of printed circuit board 15A and extends through a hole in upper surface 9. A metal trace 17A is contacted to provide a switch closure when the upper surface of membrane switch unit 17 is depressed. An output transformer 18, a microcontroller 19, and five light emitting diodes D1–5 are mounted on the upper surface of printed circuit board 15. As shown in FIG. 3B, a piezoelectric transducer 21 is supported on output transformer 18, and is contacted by a "nipple" 11 (FIG. 5) formed on the underside of dome-shaped membrane 6. Piezoelectric transducer 21 can be a Model P/N: 7BB-20-6 available from Murata Electronics North America, Inc.

Figure 4A:
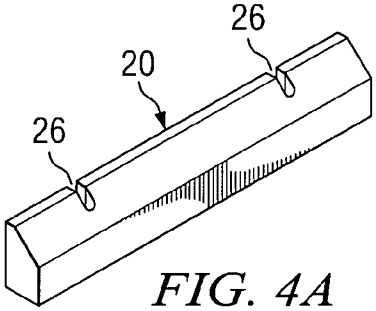
FIG. 4A is a perspective view of a LED lens reflector used within the housing of the bark limiter as shown in FIGS. 3A and 3B to provide a practical stimulation intensity indicator.
Figure 4B:
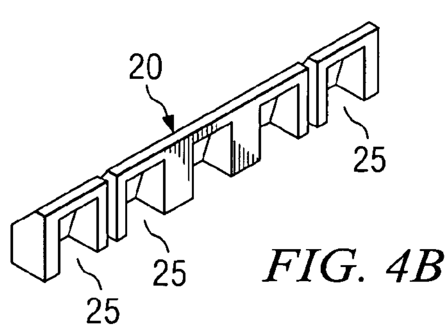
FIG. 4B is an opposite perspective view of the LED lens reflector shown in FIG. 4A.

The intensity indicators 10-1,2,3,4,5 become illuminated by light emitting diodes D1–5, respectively, as membrane switch 17 is successively depressed. An internal LED reflector element 20, shown in FIGS. 4A and 4B, is mounted on the upper surface of printed circuit board 15 so that the five recesses 25 thereof cover light emitting diodes D1–5, respectively. Notches 26 facilitate attachment of LED reflector 20 to printed circuit board 15. LED reflector 20 allows the intensity indicators 10, which appear as the numerals 1–5, respectively, in FIGS. 3A and 3B on the front of upper housing section 2B to be clearly illuminated through the thin side wall of upper housing 2B to appear when the corresponding light emitting diodes D1–5 are turned on. The five LEDs correspond to indicators 10-1,2,3,4,5 to indicate which stimulation level has been selected by means of the membrane switch 17, and also indicate whether the bark limiter 1 is in a test mode. Holding switch membrane 17 depressed for 4 seconds sets the bark limiter 1 into its test mode, and the various LEDs D1–5 blink, depending on the neck motion and barking by the dog. The LED corresponding to the intensity level selected by means of membrane switch 17 is the one which blinks. The arrangement of membrane switch 17 and the LED display arrangement including the lens reflector 20 minimizes the possibility of water leakage into the housing of the bark control device.

Figure 5:
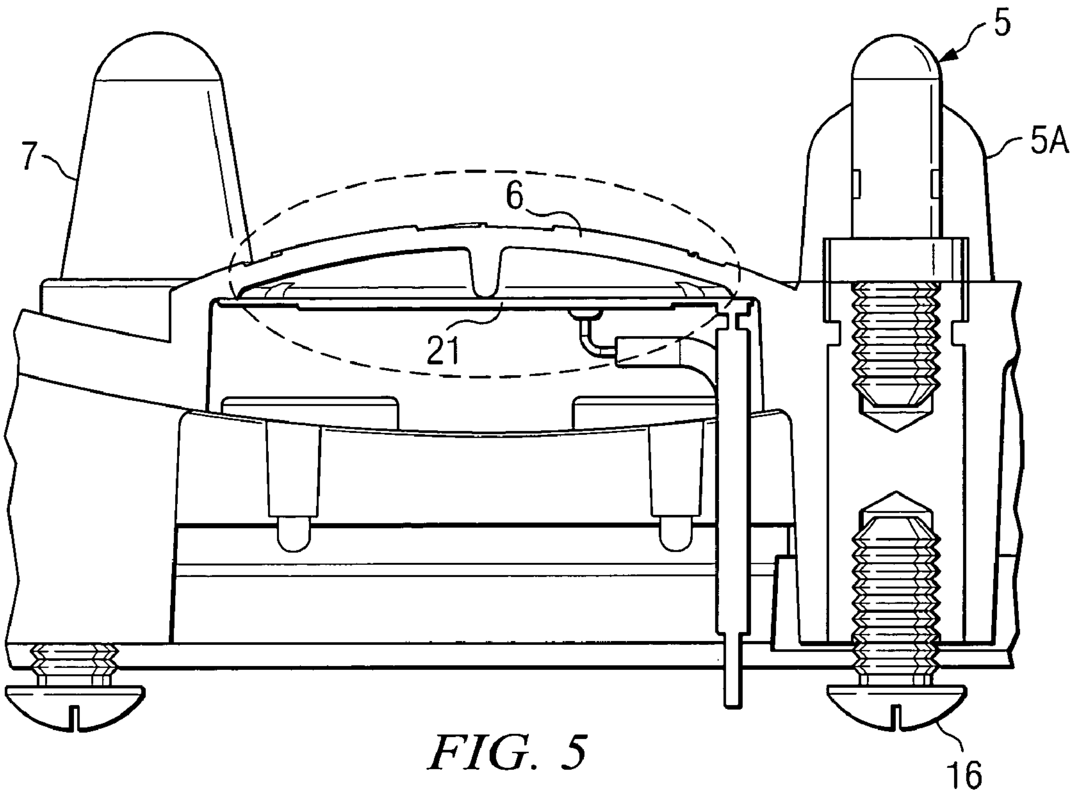
FIG. 5 shows a section on view of a vibration sensor used in the embodiment as shown in FIGS. 1A and 1B.

Referring to FIG. 5, the dome-shaped structure of acoustic membrane 6 and the location and structure of nipple 11 pressing against the central, most sensitive portion of the surface of piezoelectric transducer 21 are shown.

Figures 1, 6:
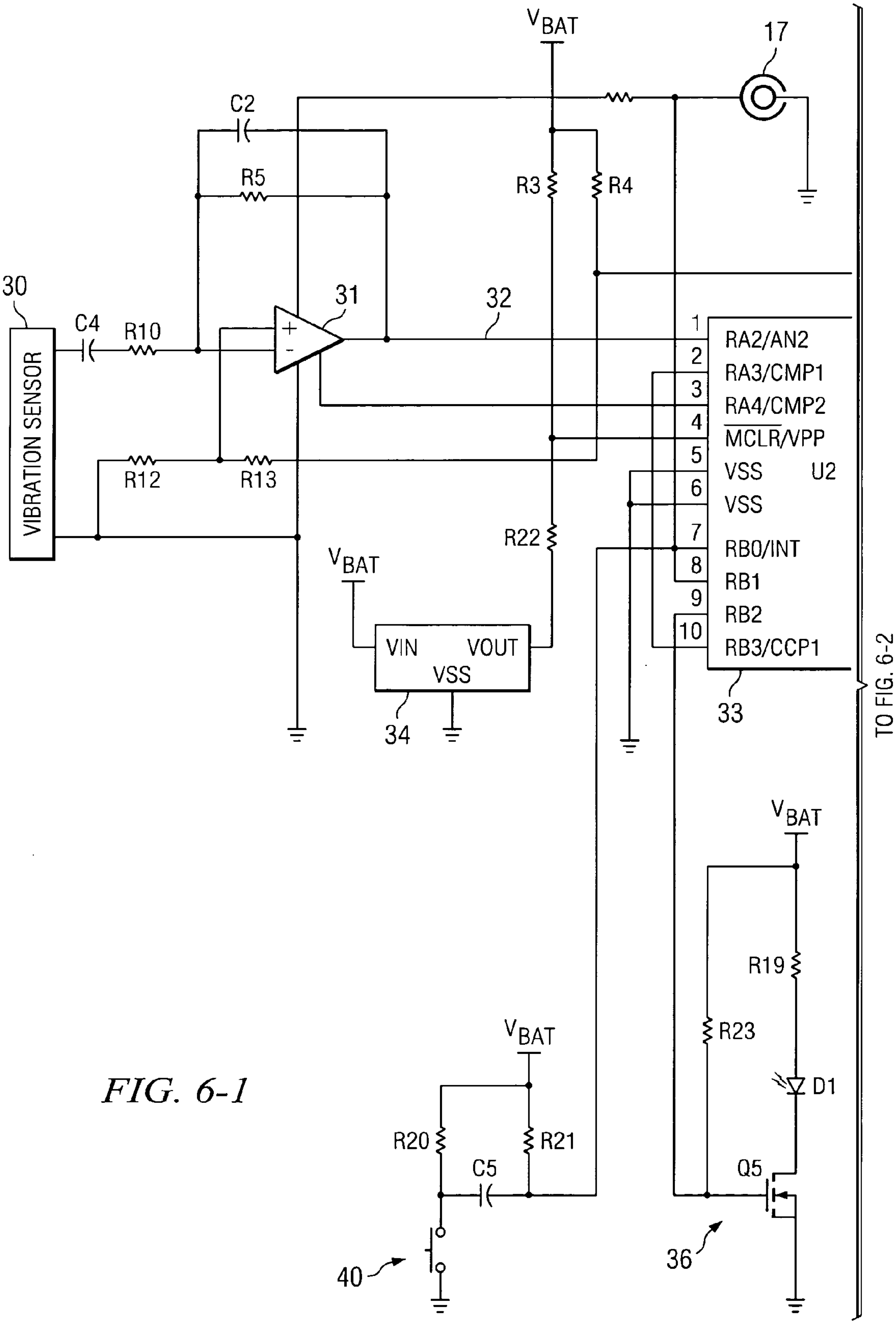
Figures 2, 6:
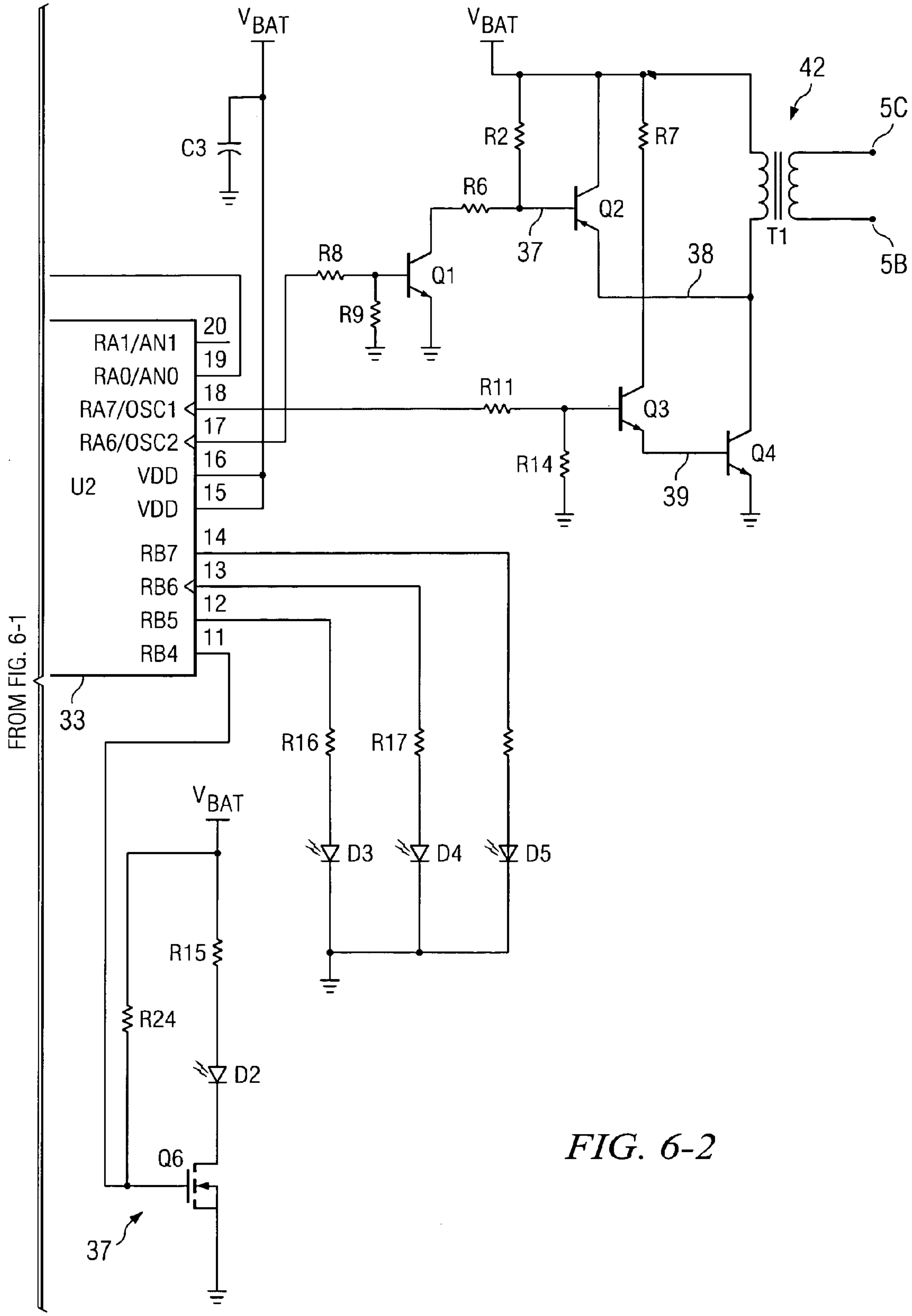

Referring to FIGS. 6-1 and 6-2, the circuitry of bark limiter 1 is provided on the upper surface of printed circuit board 15A (FIG. 3A), and includes vibration sensor assembly 30 which includes above mentioned dome-shaped membrane 6, piezoelectric transducer 21, and the above-mentioned nipple 11 formed on the underside of membrane 6 in order to efficiently transmit vibrations from membrane 6 to piezoelectric transducer 21. One of the electrodes of piezoelectric transducer 21 is connected to ground and the other is coupled by capacitor C4 and resistor R10 to the (−) input of an operational amplifier 31. The (+) input of operational amplifier 31 is connected to the junction between resistor R12 and resistor R13. The other terminal of resistor R12 is connected to ground, and the other terminal of resistor R13 is connected to one terminal of resistor R4 and to the RA0 input on lead 19 of microcontroller 33. The other terminal of resistor R4 is connected to the battery voltage VBAT.

The output of operational amplifier 31 is connected by conductor 32 to the RA2 input on lead 1 of microcontroller 33 and also is connected to one terminal of capacitor C2 and one terminal of resistor R5. The other terminals of resistors R5 and capacitor C2 are connected to the (−) input of operational amplifier 31. The RA2 input of microcontroller 33 is connected to one input of an internal comparator, the other input of which is connected to the RA0 terminal of microcontroller 33, in order to produce an internal square waveform to be used as an input to the internal microprocessor portion of microcontroller 33, to allow the frequency of the square waveform to be determined. The capacitor C2 functions as a low pass filter that sets the upper cutoff frequency of operational amplifier 31. The resistors R5 and R10 to determine the gain of operational amplifier 31.

Voltage monitor circuit 34 in FIGS. 6-1 and 6-2 produces a low output voltage if VBAT is less than approximately 2 volts, and the junction between resistors R3 and R22, which are coupled in series between VBAT and the output of voltage detector 34, applies a reset signal to the microcontroller reset input MCLR on lead 4 thereof if VBAT is below approximately 2 volts. A resistor R4, in combination with resistors R13 and R12, forms a threshold circuit that establish a threshold voltage to be applied to the internal comparator of microcontroller 33 via its RA0 input. The output of the internal comparator of microcontroller 33 is produced on lead 2 of microcontroller 33, which is externally connected to the CCP1 input on lead 2 of microcontroller 33. The CCP1 input of microcontroller 33 is used in the subsequently described compare-capture mode of operation, to measure the periods of the square waveforms on the CCP1 input. This allows the signals produced by vibration transducer 30 and amplified by operational amplifier 31 to be captured within an approximately 120 millisecond interval, and in effect, assembled into a frequency spectrum including sixteen 40 Hz windows in the range from 150 Hz to 800 Hz, which can be used to determine if the present sound is a valid bark.

Actuation of the motion sensor 40 in FIGS. 6-1 and 6-2 results in a signal applied to lead 7 of microcontroller 33 to indicate whether the dog's present neck motion is of the kind characteristically caused by barking. Microprocessor 33 automatically switches from low-power standby operation at 37 kHz to normal operation at 4 MHz if this signal indicates that the dog has begun barking.

The RB2, 4, 5, 6, and 7 outputs of microcontroller 33 selectively turn on LEDs D1–5, respectively, in response to the pressing of membrane switch 17. However, if microcontroller 33 is reset as a result of VBAT being less than 2.2 volts, microcontroller 33 produces high impedance outputs, and in that case, resistors R23 and R24 pull the gate voltages of MOSFETs Q5 and Q6 to VBAT thereby turn them on and allow the battery to discharge completely through light emitting diodes D4 and D5, turning them both on until the battery is completely dead. If LEDs D4 and D5 emit light simultaneously, that indicates that the battery is discharged and needs to be replaced.

The RA6 output on lead 17 of microcontroller 33 is coupled to the base of an NPN transistor Q1 having its emitter connected to ground and its collector coupled by a resistor R6 to the base of a PNP transistor Q2 having its collector connected to VBAT and its emitter connected by conductor 38 to one terminal of the primary winding of output transformer 42. The base of transistor Q2 also is coupled by a resistor R2 to VBAT. The RA7 output on lead 18 of microcontroller 33 is coupled to the base of an NPN transistor Q3 which has its collector coupled by resistor R7 to VBAT and its emitter connected to the base of an NPN transistor Q4. The emitter of transistor Q4 is connected to ground and its collector is connected to conductor 38. The other terminal of the primary winding of output transformer 42 is connected to VBAT. The secondary winding terminals 5B and 5C are connected to the two stimulus electrodes 5.

Transistor Q4, when turned on, produces a constant collector current for the entire amount of time that transistor Q4 is turned on. If all of the collector current of transistor Q4 flows through the primary winding of transformer 42, that results in delivery of a maximum amount of energy to the primary winding of transformer 42 and therefore in a maximum amount output energy delivered to the stimulus electrodes 5 by the secondary winding of transformer 42. However, if transistor Q2 is turned on after the peak Vp of the flyback spike that occurs in the waveform of the voltage V38 on conductor 38 immediately after transistor Q4 is turned off, then some of the decaying current in the primary winding of transformer 42 is shunted, causing V38 to rapidly fall to zero. This reduces the amount of energy delivered to the primary winding of transformer 42 for each pulse of the waveform V39 applied to the base of transistor Q4 by microcontroller 33, and therefore also reduces the amount of stimulus energy delivered through stimulus electrodes 5 to the dog's neck.

Microcontroller 33 operates to produce a burst of pulses which are applied to the base of transistor Q4 via the Darlington circuit configuration including transistor Q3. Each burst is approximately 0.5 seconds in duration, and each pulse width is approximately 0.9 to 1.0 milliseconds in duration. The intensity of the stimulation applied to the dog's neck is controlled by synchronously turning on shunt transistor Q2 to divert a controlled amount of the collector current of transistor Q4 away from the primary winding of transformer 42. This approach has the advantage of shunting some of the current in the primary winding of transformer 42 after the peak of the flyback spike of V38 through shunt transistor Q2 to the battery supplying VBAT. During each turn-on pulse applied to the gate of MOSFET Q4, its drain current is constant, and the magnitude of that drain current is what determines the peak value of the flyback voltage on conductor 38 and consequently also mainly determines the open circuit voltage produced between stimulus electrodes 5 by the secondary winding of output transformer 42. Since Q2 is not turned on until after the peak of the flyback pulse of V38, the peak value of the flyback voltage pulse is substantially independent of the selected stimulus level, and therefore the desired large open circuit output voltage produced by transformer 42 also is substantially independent of the selected amount of stimulus energy to be applied via output transformer 42 to the animal's skin.

Figure 7A:
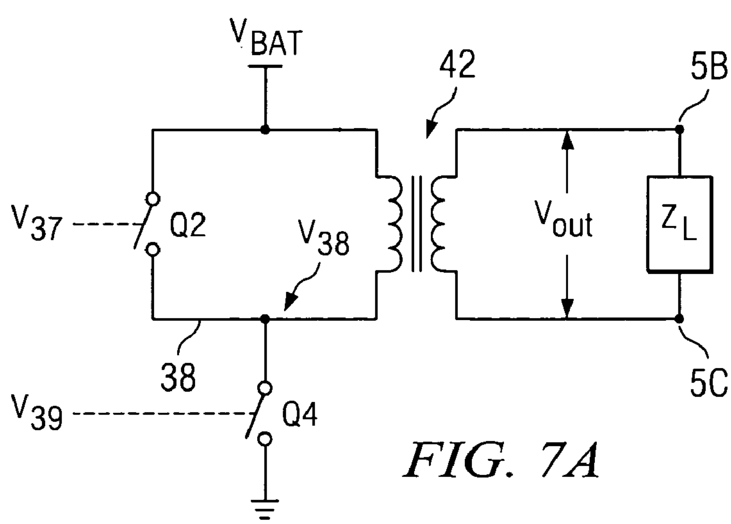
FIG. 7A is a diagram useful in explaining the waveforms of FIGS. 7B–G.
Figure 7B:
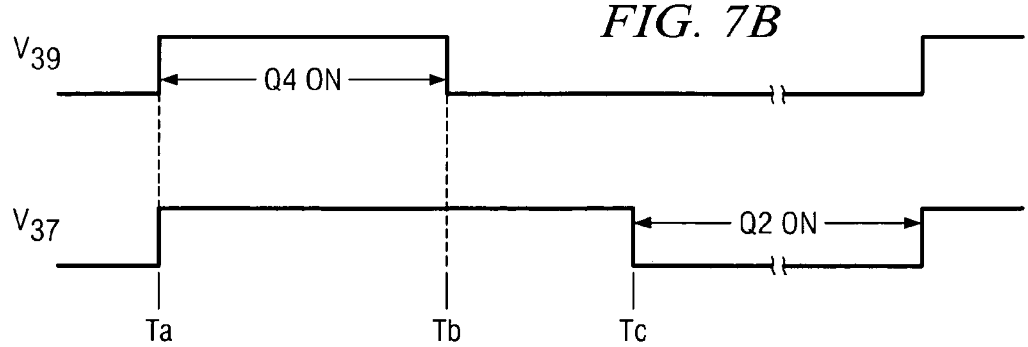
FIG. 7B is a timing diagram of the signals applied to switches SW1 and SW2 of the circuit of FIG. 7A.

Referring to FIG. 7A, in this diagram shunt transistor Q2 is, for convenience, shown as a simple switch controlled by the Q2 base drive signal V37 and primary current transistor Q4 which also is shown as a simple switch controlled by the Q4 base drive signal V39. The impedance between stimulus electrodes 5B and 5C, including the impedance of the dog's neck and the contact resistances associated with the tips of electrodes 5B and 5C, is indicated by the impedance ZL. Referring to FIG. 7B, the signal V39 includes a burst of constant-width pulses generated by microcontroller 33, and, for each pulse, turns transistor Q4 on at a time Ta and turns transistor Q4 at a time Tb. The signal V37 includes a burst of variable width pulses, if desired, to control the amount of energy delivered to the primary winding of transformer 42 by operating shunt transistor Q2 to shunt the primary winding during a selectable part of the decaying portion of the flyback spike of the voltage V38 on conductor 38. The pulse of V37, if present, turns primary winding switch transistor Q2 on at a time Tc and turns it off at the following time Ta.

FIGS. 7C–G show the characteristics of the transformer primary winding "flyback" voltage waveform produced on conductor 38 as a result of the combined operation of the shunt path circuitry including transistors Q1 and Q2 and the primary winding current circuitry including transistors Q3 and Q4 in response to microcontroller 33. As shown in FIGS. 7C–G, the peak voltage Vp of each flyback spike 50 of V38 is relatively independent of whether shunt transistor Q2 is not turned on in order to allow maximum energy to be delivered to the primary winding, and also is relatively independent of the amount of time that shunt transistor Q2 is turned on after the peak of each flyback spike 50 in order to reduce the amount of energy delivered to the primary winding of output transformer 42. The segments 50D in FIGS. 7D–G indicate that turning on the shunt transistor Q2 causes the subsequent portion of V38 to rapidly fall to zero, thereby reducing the amount of energy delivered to the primary winding of transformer 42, and therefore reducing the amount of energy delivered by the secondary winding to the dog's neck.

Figure 7C:
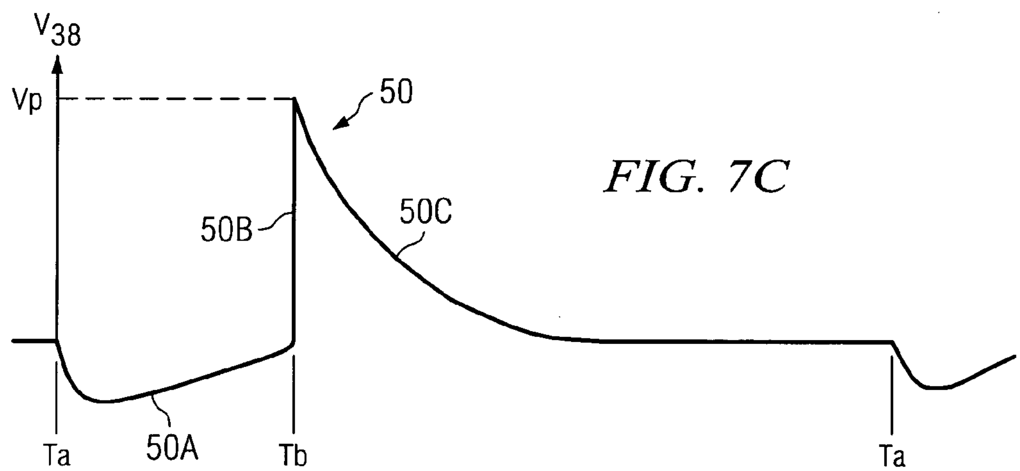
FIGS. 7C–G are diagrams representative of the flyback voltages appearing on conductor 38 and the corresponding output signals applied via stimulus electrodes 5A and 5B to the skin of the dog's neck, represented by the load impedance $Z_L$ in FIG. 7A in response to variations of the delay between the times Tb and Ta.
Figure 7D:
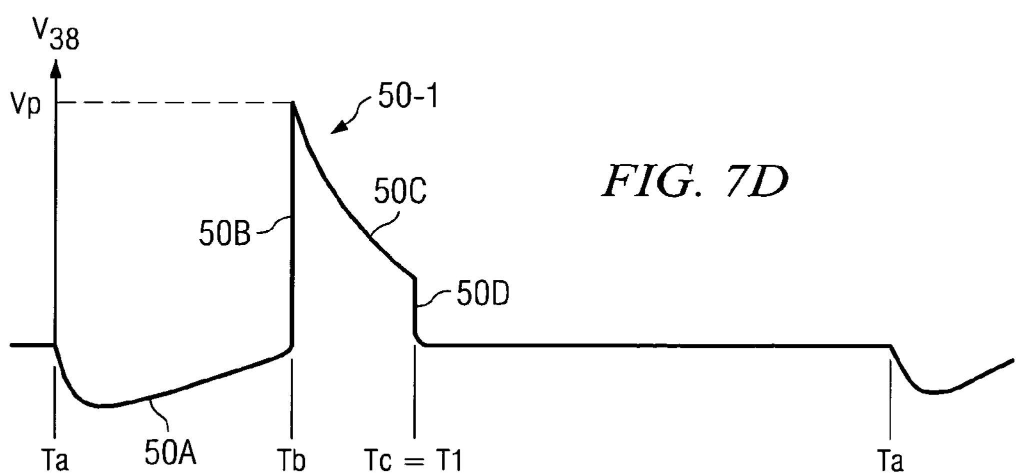
Figure 7E:
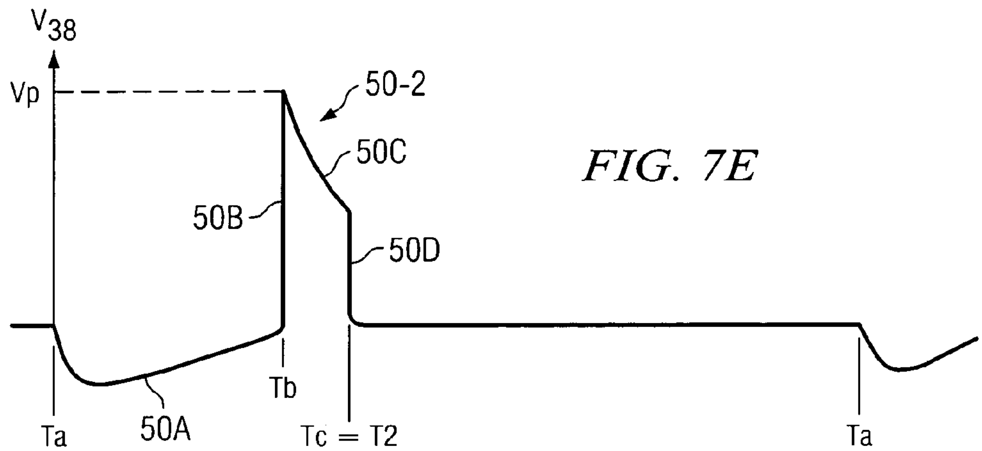
Figure 7F:
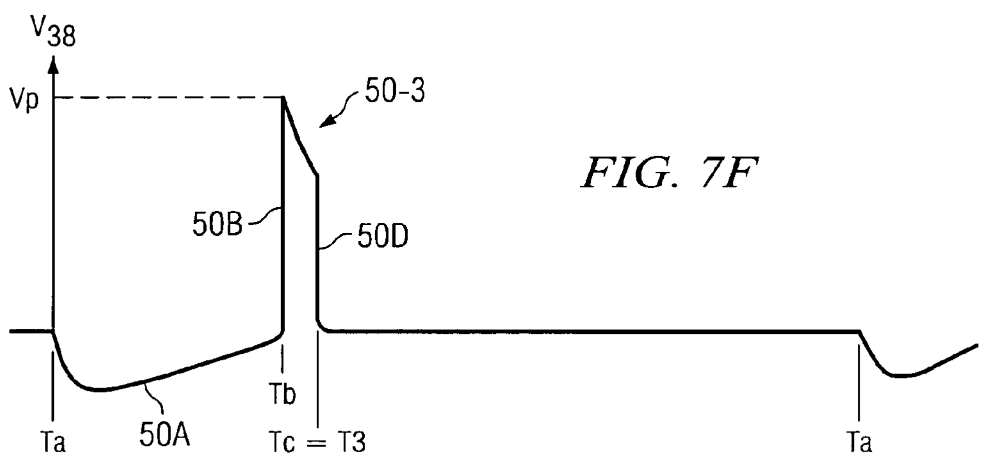
Figure 7G:
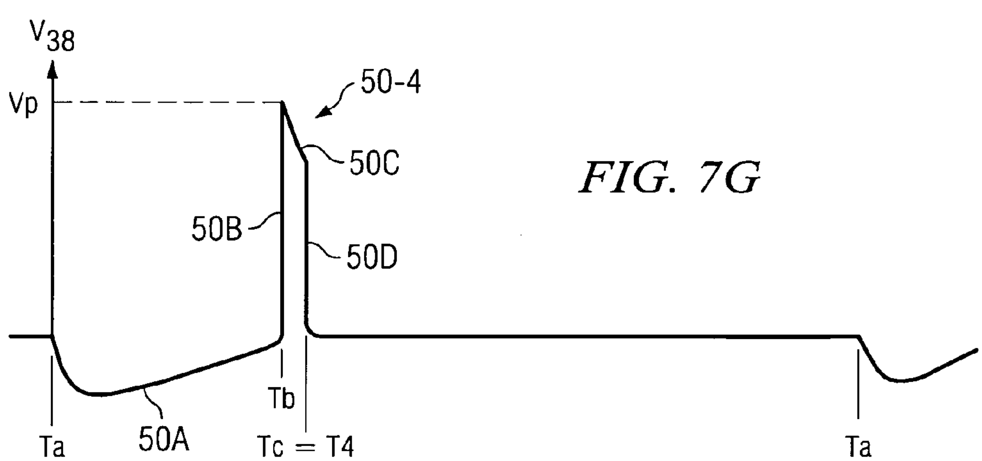

In FIG. 7C, the steep leading edge of flyback spike 2 to the occurs when transistor Q4 is turned off at time Tb. Shunt transistor Q2 is not turned on, so portion 50C of flyback spike 50 is allowed to decay all away to zero with no shunting, which corresponds to the maximum stimulus intensity setting. In FIG. 7D, shunt transistor Q2 is turned on at a time Tc equal to T1, which rapidly decreases V38 to zero at time T1, so less energy is to delivered to the primary winding than in FIG. 7C. In FIG. 7E, shunt transistor Q2 is turned on sooner than in FIG. 7D, at time Tc equal to T2, so less energy is delivered to the primary winding than in FIG. 7D. In FIG. 7F, shunt transistor Q2 is turned on sooner than in FIG. 7E, at time Tc equal to T3, so less energy is the total delivered to the primary winding than in FIG. 7E. In FIG. 7G, shunt transistor Q2 is turned on sooner than in FIG. 7F, at time Tc equal to T4, so even less energy is delivered to the primary winding than in FIG. 7F.

Thus, in one embodiment of the invention two control signals are in effect applied by microcontroller 33 to control the energizing of the primary winding of the output transformer, including the constant-width turn-on pulse signal applied to the gate of MOSFET Q4 to establish the constant open circuit voltage produced between the stimulus electrodes, and also including a shunt control signal which controls the synchronous turn-on of shunt transistor Q2 after the occurrence of the peak value of the flyback voltage on conductor 38 in order to control the amount of energy delivered to the primary winding of the transformer, and therefore the amount of RMS stimulus energy delivered the dog. This is in contrast to some of the assignee's prior collar-mounted electronic animal training devices and numerous other prior art animal training devices in which the desired stimulation intensity is varied only by changing the widths of the current pulses driven through the primary winding of the output transformer.

Figures 1, 8:
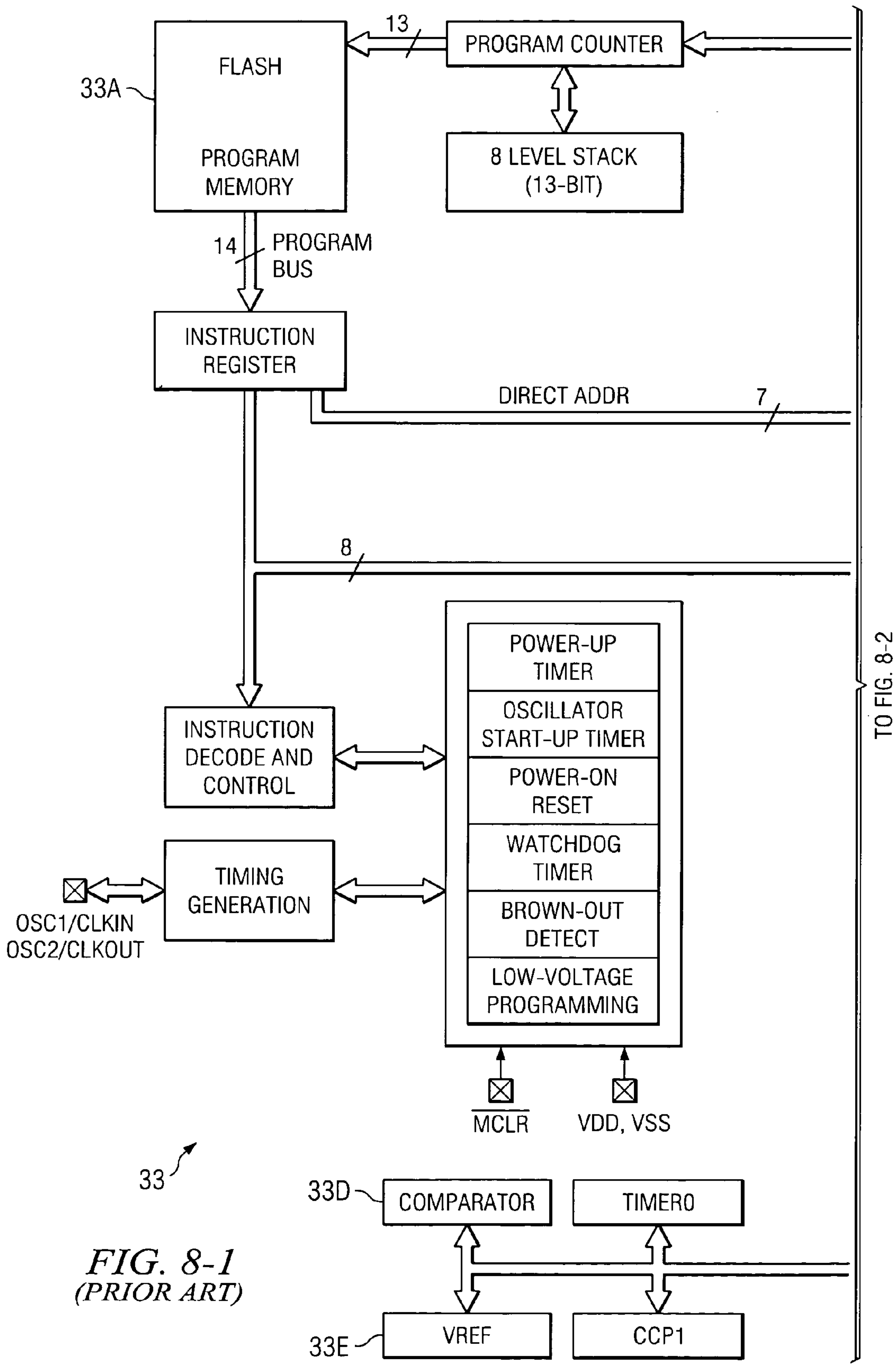
Figures 2, 8:
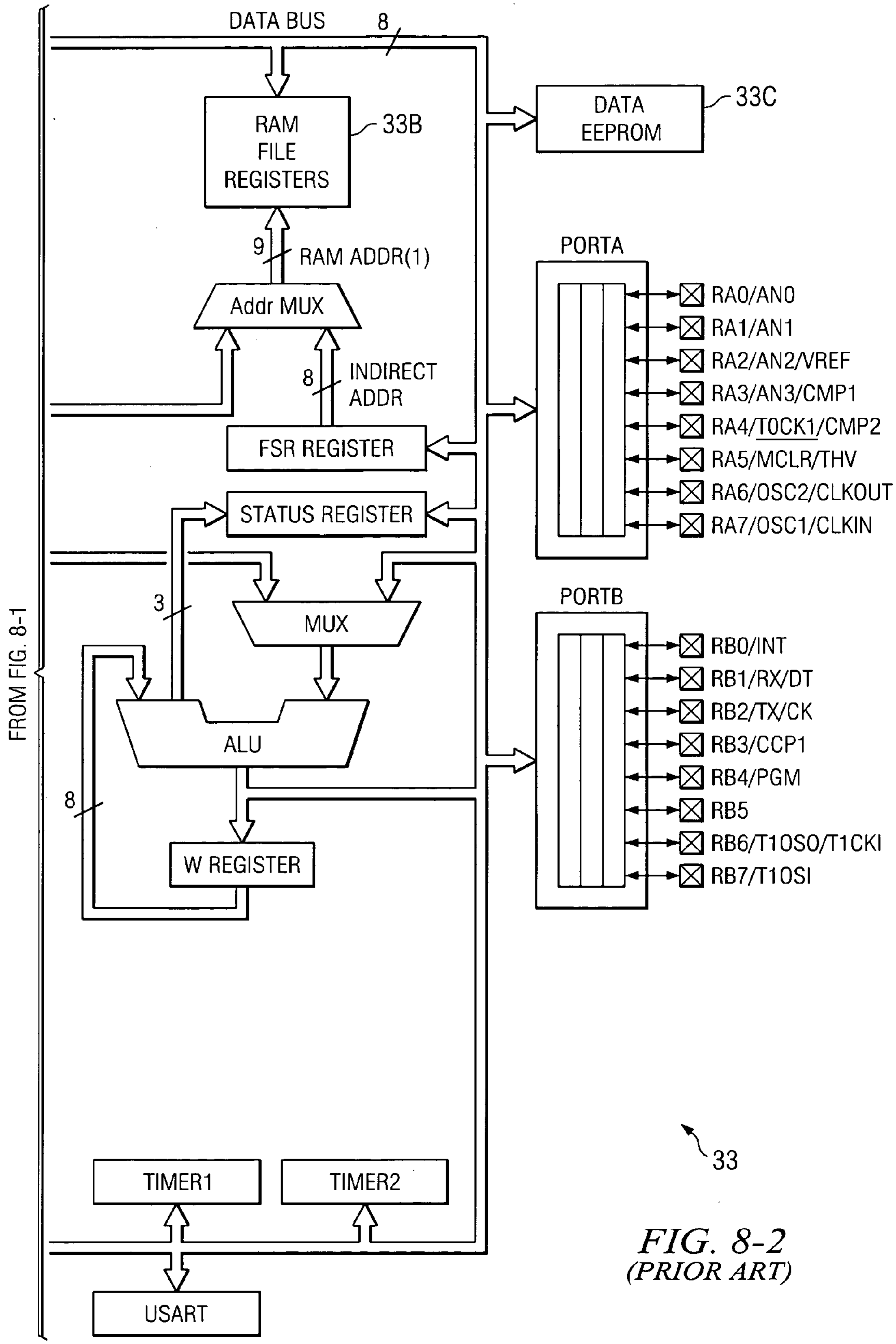

The microcontroller 33 used in the improved bark limiter 1 of the present invention preferably is a PIC16F628 available from Microchip Technology Incorporated, which includes several signal conditioning operational amplifiers, and operates so as to perform the same functions of executing the program represented by the flowchart of FIGS. 9A–E. The details of microcontroller 33 are shown in FIGS. 8-1 and 8-2. As shown in FIGS. 8-1 and 8-2, microcontroller includes a flash memory 33A, a random access memory 33B for storing file registers, and a non-volatile EEPROM 33C for storing the operating program and valid bark detection algorithms. Microcontroller 33 also includes the above-mentioned comparator 33D which generates the signal Data In, and also includes a Vref circuit 33E that produces 1 of 16 voltage levels provided as inputs to the comparator input if the comparator input is configured so that a Vref input is needed.

By way of definition, the terms "controller" and "microcontroller" are used herein is intended to encompass any microcontroller, digital signal processor (DSP), state machine, logic circuitry, and/or programmed logic array (PLA) that performs functions of microcontroller 33 as described above.

Motion sensor 40 can be a Model #SQ-SEN-001P Ultra Compact Tilt and Vibration Sensor, available from SignalQuest Inc. Motion sensor 40 is of a mechanical ball-in-tube construction, and includes a conductive ball that makes contact with appropriate electrodes in response to motion of the dog's neck in order to send the "wake-up" signal microcontroller 33. Motion patterns that are characteristic of barking can be detected using motion detector 40, and furthermore, a captured digitized barking or vocalization signal can be utilized to provide a frequency spectrum that represents a "valid" bark in order to provide more accurate bark detection that has previously been achieved.

The vibration detection operation, motion detection operation, and valid bark determination based on the frequency spectrum of the dog's vocalization are combined to determine whether an aversive stimulus signal should be produced between electrodes 5B and 5C. The motion detection is used primarily as part of detection of a valid bark, and is used secondarily to accomplish awakening bark limiter 1 from its sleep mode. Either the subsequently described "valid bark" detection based on the frequency spectrum of signals received from vibration sensor 30 or motion signals based on movement of motion detector 40 could be considered the primary bark detection function and the other could be considered to be the secondary bark detection function. The bark limiter could be awakened or powered up in response to barking, and the aversive stimulus could then be triggered by detection of neck motion, or vice versa.

Bark limiter 1 has an external power switch function that is performed by membrane switch 17, and also can be automatically turned on or "awakened" by motion sensor 40 in response to the dog making the kind of characteristic head movement that corresponds to barking by the dog. Motion sensor 40 "wakes up" the bark limiter 1 from a low power stand by condition and stimulates microcontroller 33 to begin looking for a "valid" barking signal/sound. In the low power condition, microcontroller 33 runs at 37 kHz. Once it is awakened, microcontroller 33 runs at 37 kHz, and if any barking signals are detected, microcontroller 33 operates at 4 MHz to process that information, and then returns to a 37 kHz speed.

The ON mode includes both the SLEEP mode and the ES LEVEL CHANGE mode. The OFF mode allows the bark limiter 1 to be awakened as a result of a switch trigger signal produced by depressing switch 17, and if that occurs, the program executed by microprocessor 33 checks to determine if switch 17 is depressed for least 0.1 seconds, and if it is not, automatically goes back into the SLEEP mode. If bark limiter 1 is in both the ON mode and the SLEEP mode, and a signal is received from motion sensor 40, it immediately checks for a bark signal from vibration sensor 30 while microprocessor 33 is internally operating at 4 MHz, and if there is no bark signal from vibration sensor 30, and the internal clock signal is reduced to 37 kHz, waits for a period of 2 seconds, and then reenters the SLEEP mode. Thus, a user can determine if bark limiter 1 is in its ON mode by subjecting bark limiter 1 to sufficient motion to cause motion sensor 40 to produce a motion signal and noticing if the light emitting diodes blink several times.

The two field effect transistors Q5 and Q6 connected in series with LEDs D4 and D5, respectively, are used to indicate that the battery voltage is too low when the voltage monitor circuit produces a voltage below 2.2 volts. When the microcontroller 33 is reset, all of its outputs go to a high impedance state, and LEDs D4 and D5 are turned on. They continue drawing current until the battery is completely dead. Since the operation of the microcontroller is not assured for supply voltages below 2.2 volts, it is set to a "nonoperative", high output impedance condition so to avoid any possibility of unintended stimulation of the dog if the battery voltage is too low.

The present invention provides an improved technique of bark detection with software by using the internal "Capture/Compare module" of the PIC16LF627 microcontroller 33 to determine what vocalization by the dog constitute "valid" barks. During a 120 ms (or similar) capture time interval, the periods of the various bark signal frequencies are measured and counted. A window of acceptable frequencies in the range of, for example, 150 Hz–800 Hz, is created by the software. This interval or "window" is divided into 16 "buckets" into which the counts of 16 evenly divided frequency ranges are stored. When a bark/sound signal is received, the periods of the bark frequencies are measured during the 120 ms capture interval. The period of the frequency component of the received bark/sound signal is measured, and if the measured period falls within one of the 16 buckets, i.e. frequency ranges, then a software counter assigned to that bucket is incremented. For each complete bark signal/sound captured, the counter totals are compared to predetermined threshold levels (representing a predetermined "valid bark" frequency spectrum) for each corresponding bucket, respectively in order to determine whether the bark/sound constitutes a "valid" bark.

A software "bark counter" is executed by microcontroller 33 to count the number of times the dog is stimulated in response to detection of a valid bark while bark limiter 1 is mounted on the dog. The bark counter contents can be determined by the trainer or dog owner when the collar is removed and turned off. The bark counter content is determined by counting the number of times the middle number three indicator LED 3 blinks after a switch 17 has been held pressed for more than 3 seconds.

The present invention also provides a lightweight bark limiter 1 in a small package which is usable on small dogs yet is capable of providing much higher stimulus levels than the small, lightweight bark limiting devices of the prior art. The membrane switch 17 allows convenient manual selection the stimulation level to be applied to dog's neck.

The internal reflector 20 allows the light emitted by the LEDs to effectively pass through the translucent housing material. This is to avoid the need to "light up" the entire housing and focuses the illumination on the windows for the intensity indicator LEDs avoids the need for the expense of placing the LEDs close to the edge of the housing and also avoids the need for the expense of providing thinner walled windows to be molded into the housing for the LED light to shine through. The combination of the translucent housing and the reflector lens 20 provides the substantial benefit of making it easier to make the entire bark limiter leakproof while also providing a convenient means for indicating its operating state or condition.

A 30 second interval is established when the desired electrical stimulus level is changed or if the bark limiter 1 is turned on. During the 30 second interval, the only thing that can happen is for the user to select the desired stimulus level or to turn bark limiter 1 off. During that 30 second interval the lights blink every second. If the user selects a particular stimulus level, it the 30 second timer is reset.

Figure 9A:
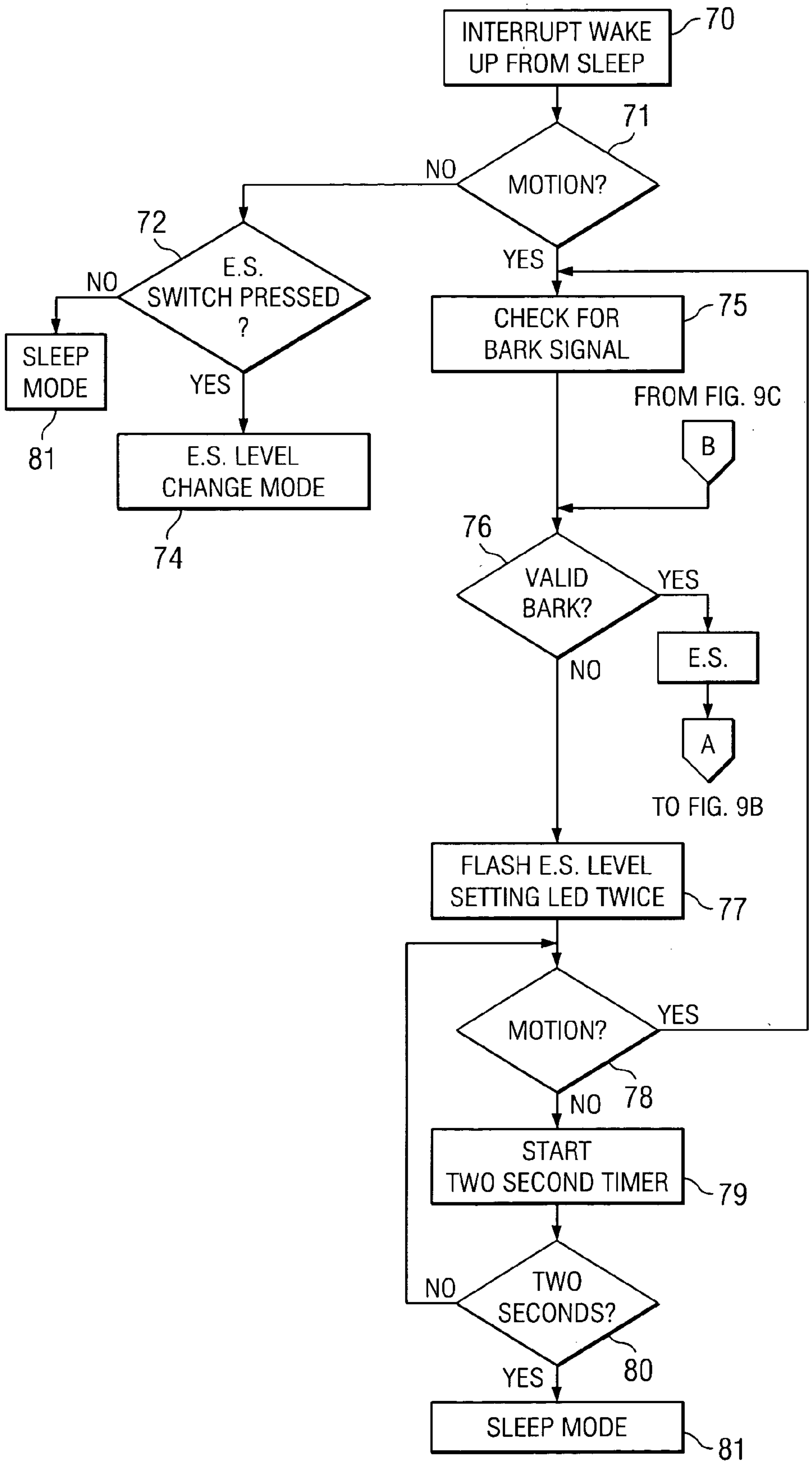
FIGS. 9A–E constitute a flowchart of a group of programs executed by the microcontroller 33 included in FIGS. 6-1 and 6-2.

FIG. 9A shows how bark limiter 1 is awakened from its "SLEEP" mode in response to a motion-indicating interrupt signal from motion detector 40. If a motion signal is received by microcontroller 33, the program goes from decision block 71 to block 75 and checks to determine if any signal is being received on conductor 32 in response to vibration sensor 30. In decision block 76, the program executes the subroutine of FIG. 9C to determine if the spectrum of sound signals received from vibration sensor 30 is the spectrum of a "valid bark". If this determination is affirmative, the program goes to the routine of FIG. 9B to generate an aversive electrical stimulus (E.S.) signal between stimulation electrodes 5B and 5C.

Figure 9B:
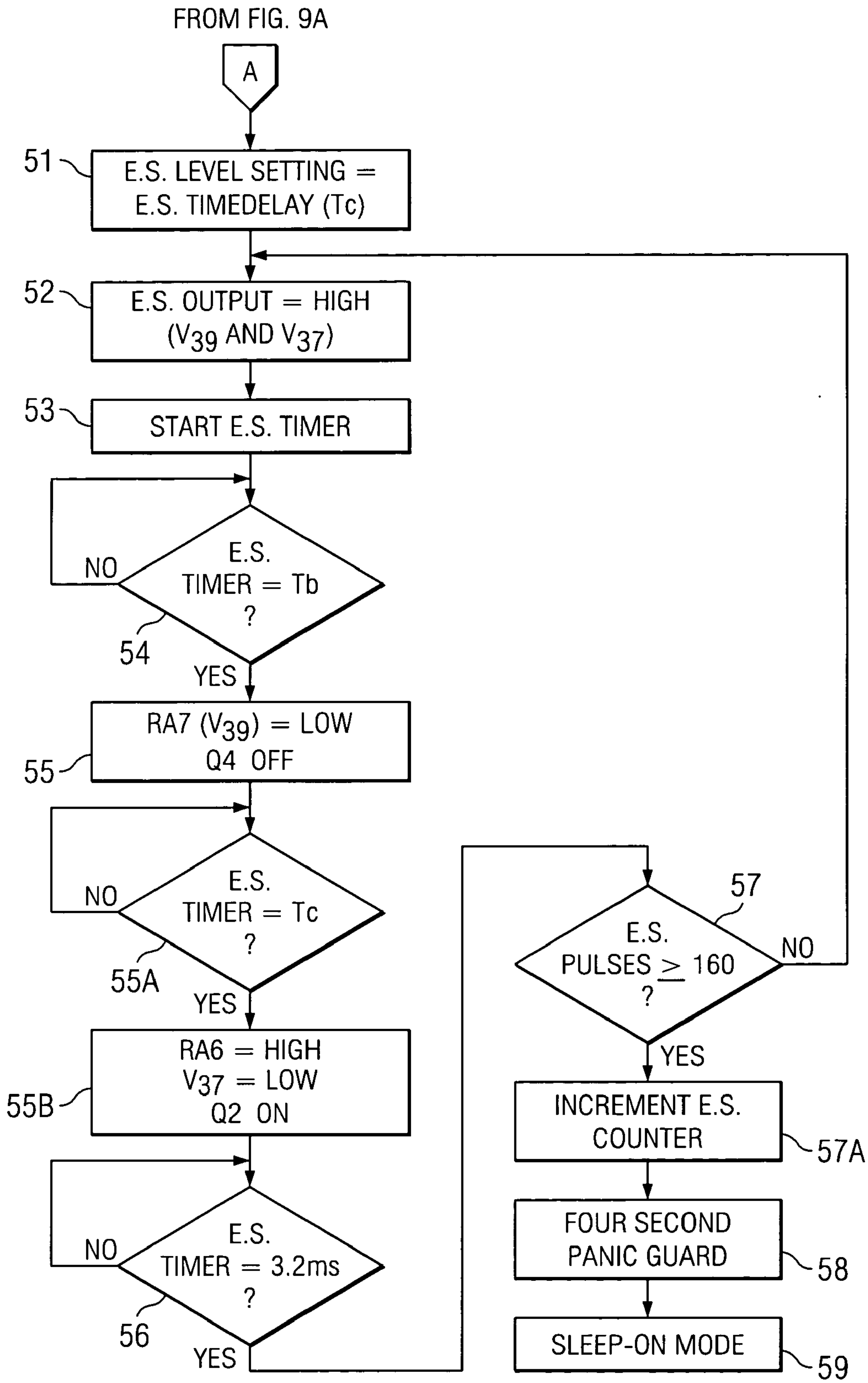

Referring to FIG. 9B, in block 51 the program executed by microcontroller 33 determines the selected stimulation level, i.e., determines the electrical stimulus time delay value that results in one of the waveforms shown in FIGS. 7C–G that has been set by means of switch 17 and stores it in the non-volatile memory 33E (FIGS. 8-1 and 8-2). As indicated in block 52, microcontroller 33 sets V37 and V39 to high levels in block 52 in order to switch on the primary winding current in transformer 42, and then in block 53 starts a software timer "ES (electro-stimulus) Timer" to the value "E.S. Time Delay" determined in block 51. The program then goes to decision block 54 and continues to "loop" as long as the count of "ES Timer" of block 53 has a value less than "E.S. Time Delay". After the selected time delay interval has elapsed, the program goes to block 55B and sets the signal RA7 on lead 18 of microcontroller 33 to a low level, which causes V39 to go to a low level and causes the flyback transition 50B of FIGS. 7A–G to occur. After a delay Tc has elapsed, as indicated in decision block 55A, the program sets the level RA7 on lead 18 of microcontroller 33 to a high-level, V37 to a low level, and turns transistor Q2 on. Every stimulation pulse produced by microcontroller 33 on the base of transistor Q3 has a duration of 3.2 milliseconds. For every stimulus signal produced by microcontroller 33, block 56 of the program of FIG. 9B causes the stimulus output signal produced by microcontroller 33 on its lead 2 to be at a low level until the 3.2 milliseconds has elapsed.

The program then goes to decision block 57 and determines if the number of stimulus pulses produced by microcontroller 33 is less than or equal to 160 (which corresponds to approximately half a second of electrical stimulation applied between electrodes 5B and 5C), and if that determination is affirmative, the program goes back to the entry point of block 52 and continues to repeat the foregoing sequence until a negative decision is made in block 57. The program then increments the software bark counter, as indicated in block 57A, and then goes to block 58 and then, as indicated in block 58, starts a 4 second panic guard routine to prevent "panic barking" that can be caused by the electrical stimulus experienced by the dog, and then the program causes microcontroller 33 to go into its sleep mode, as indicated in block 59.

Referring again to FIG. 9A, if the decision of block 76 is that no valid bark is occurring, the program goes to block 77 and causes the LED corresponding to the selected stimulation level to flash twice, and then goes to decision block 78 and determines if a signal from motion detector 40 indicates that a significant neck motion is occurring. If this determination is affirmative, the program returns to the entry point of block 75 to determine if a bark signal is being received from vibration sensor 30. If the determination of block 78 is negative, the program goes to blocks 79 and 80 and determines if a 2 second interval elapses without neck motion being detected, and if this happens, the program causes microcontroller 33 to go into its sleep mode, as indicated in block 81.

If the determination of decision block 71 is negative, the program goes to decision block 72 and determines if switch 17 is depressed. If switch 17 is not depressed, the program causes microcontroller 33 to go into its sleep mode. If decision block 72 determines that switch 17 is depressed, the program responds in block 74 by determining and storing the new desired stimulus level established by repetitive depressing of switch 17. Specifically, in block 74 the program determines if switch 17 is depressed for more than 1 second, and if this is the case, increments the stimulation level setting from the present level setting (1–5) to the next level setting and saves the new stimulus level setting.

Figure 9C:
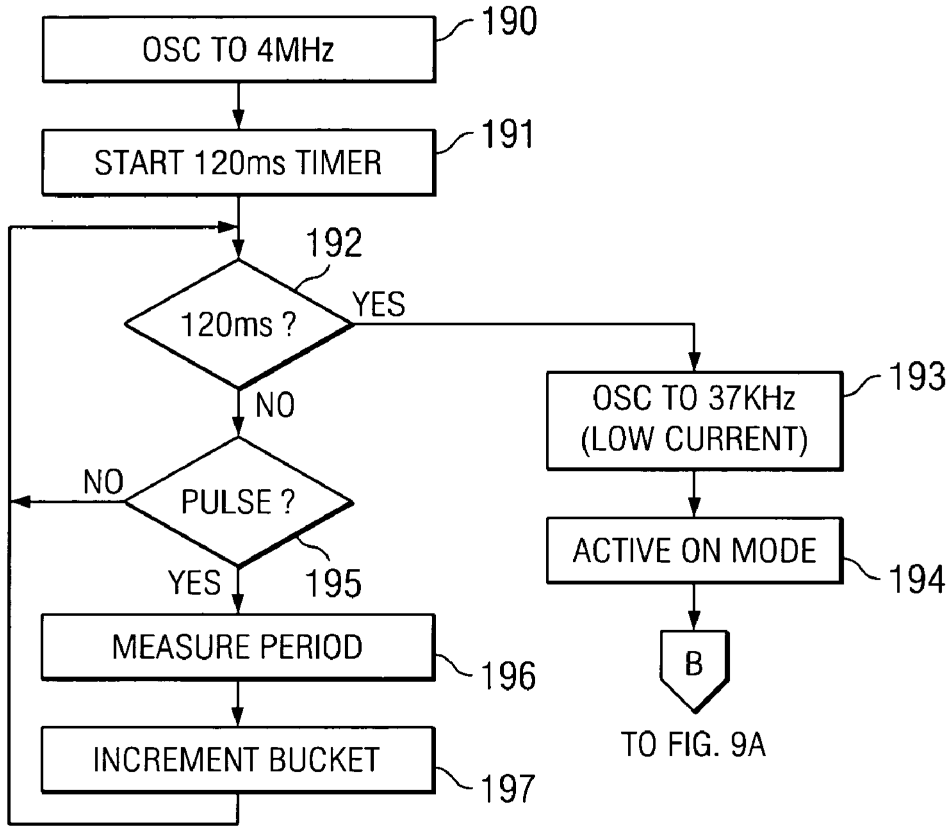

The routine performed in decision block 76 of FIG. 9A is shown in FIG. 9C. Referring to FIG. 9C, in block 190 the program switches the internal oscillator clock frequency of microcontroller 33 from 37 kHz to 4 MHz and then goes to block 191 and starts a 120 millisecond timer, to create a 120 millisecond window within which a "valid bark", if present, is to be "captured". The program then goes to decision block 192 and tests the output of the 120 millisecond timer, and after the 120 millisecond window elapses, the program goes to block 192A and runs a subroutine to determine if the vocalization detected is a valid bark. This is accomplished by comparing the number of times the frequency of the detected vocalization is captured in each frequency range or "bucket" within the 120 millisecond window with a predetermined number of times for each bucket of a known "valid bark" frequency spectrum. The program then goes to block 193 and switches the internal oscillator clock frequency of microcontroller 33 back to 37 kHz to provide low power ON mode operation. The program then returns to the entry point of decision block 76 of FIG. 9A. If block 192 determines that the 120 milliseconds timer is still counting, the program then goes to decision block 195 and determines if there is a change in the level of the signal on leads 2 and 10 of microcontroller 33 to indicate that a pulse is present. If this determination is negative, the program reenters the entry point of decision block 192, but if the presence of the pulse is detected, the program goes to block 196 and measures the duration of the pulse, and in block 197 increments the frequency spectrum "bucket" or counter which corresponds to the period (i.e., frequency) measured in block 196. The program then reenters decision block 192 and continues the process until the 120 millisecond timer elapses. The pulse referred to is generated on lead 2 of microcontroller 33 from an internal comparator therein and is provided as an input to lead 10 of microcontroller 33, which is the "capture and compare" (CCP1) input of microcontroller 33, and automatically starts a timer at the beginning of the pulse and stops the timer at the end of the pulse, so the frequency of the signal coming from vibration sensor 30 is thereby determined and can be used to select the appropriate frequency spectrum bucket to be incremented in order to acquire the frequency spectrum of the present bark signals received from vibration sensor 30 by one input of the internal comparator referred to. Lead 2 of microcontroller 33 is the output of that comparator. The reference applied to the other input of the internal comparator is established by the voltage on lead 19 by the resistive voltage divider circuitry shown in FIGS. 6-1 and 6-2.

Whenever bark limiter 1 enters the ON mode, it checks for neck motion, and if neck motion is detected, the program executed by microcontroller 33 checks for a valid bark. If there is neck motion but no valid bark, the program checks for incrementing of the selected stimulus level by means of switch 17. If no incrementing of the stimulus level by means of switch 17 is occurring, the program causes bark limiter 1 to go into the SLEEP mode.

Note that the OFF mode of bark limiter 1 is different than the above-mentioned SLEEP mode. In the OFF mode, the program checks only to determine if membrane switch 17 is being depressed to turn bark limiter 1 on. The OFF mode only serves as a mode that will be mostly the same as the SLEEP mode, in order to conserve battery life and also in order to allow bark limiter 1 to be removed from an animal in such a way that the motion sensor does not initiate an ON mode. The OFF mode also can be used as a safety feature, in the sense that bark limiter 1 can be turned off when the collar strap is being adjusted or when the bark limiter 1 is being put on or removed from the dog so that there will be no possibility of electrical stimulus being accidentally applied to the dog.

Figure 9E:
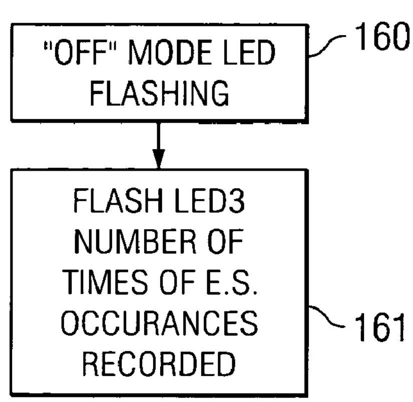
Figure 9D:
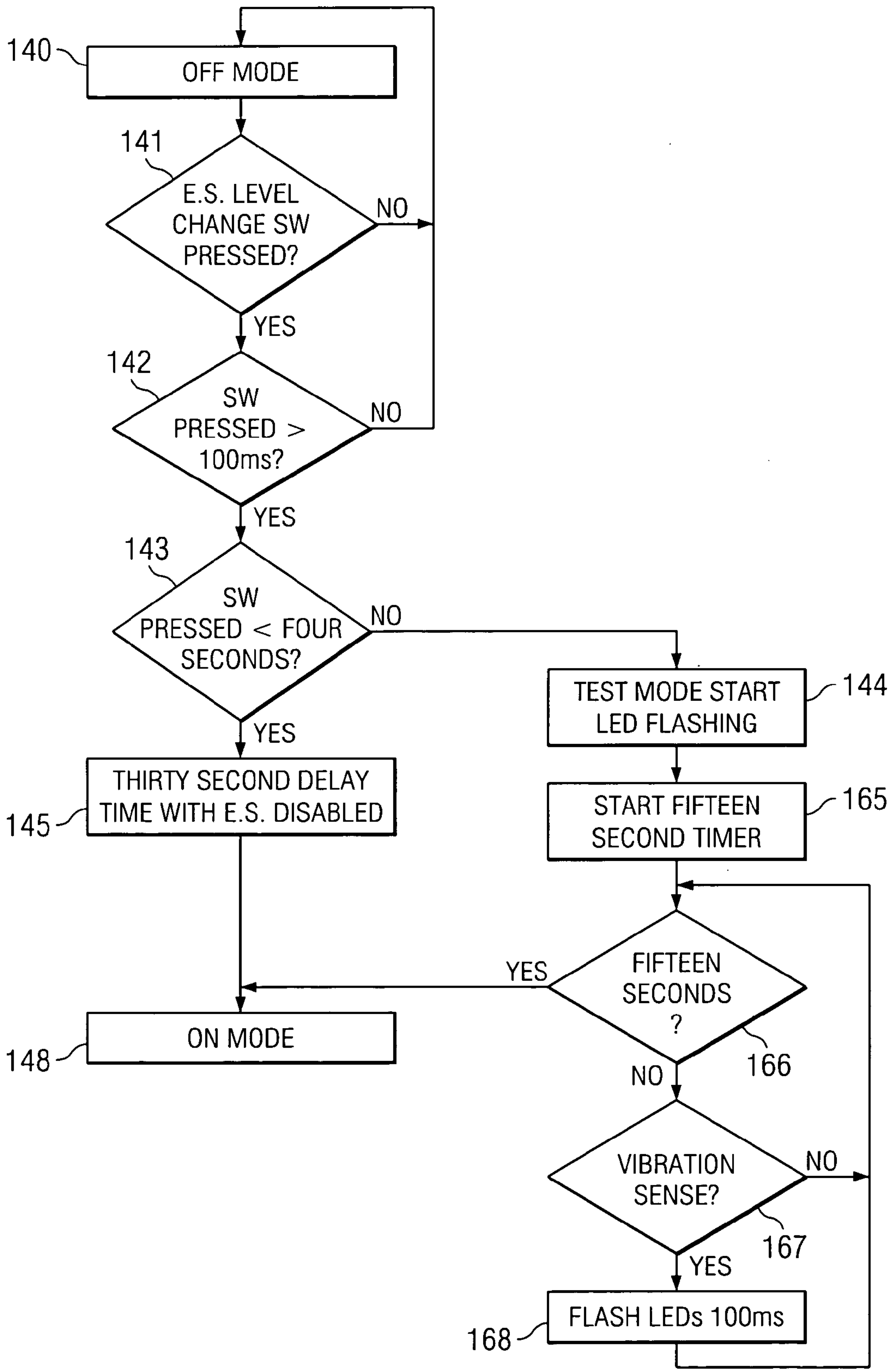

Referring to FIG. 9D, assuming that bark limiter 1 is in its OFF mode as indicated in block 140, the program enters decision block 141 and determines if switch 17 has been pressed, and if this determination is negative, the bark limiter remains in its OFF mode. If switch 17 is pressed, decision block 141 causes the program to enter decision block 142 to determine if switch 17 has been depressed for more than 100 milliseconds, and if this determination is negative, bark limiter 1 remains its OFF mode. After switch 17 has been held depressed for more than 100 milliseconds, the program goes to decision block 143 and determines if switch 17 has been depressed for less than four seconds, and if this determination is negative, the program sets bark limiter 1 to its TEST mode and executes blocks 144 through 168, as subsequently explained. However, if switch 17 has been depressed for less than four seconds, the program goes to block 145 and starts a 30 second delay time with the electro-stimulus capability of bark limiter 1 disabled. The program then goes to decision block 148 and sets bark limiter 1 to its ON mode.

In block 144, the program goes into its "TEST" mode, and that condition is indicated by LEDs 1–5 sequentially turning on and off so as to "sweep" in a sequence that indicates initiation of the self-test mode. The program then starts a 15 second timer, as indicated in block 165, and then goes to decision block 166 which detects whether the 15 second timer has elapsed, in which case bark limiter 1 is put into its ON mode, as indicated in block 148. If the 15 second timer has not elapsed, then the program goes to decision block 167 and determines if any signal is being produced by vibration sensor 30, and if this determination is negative, the program reenters decision block 166. If a signal is being received from vibration sensor 30, the program goes to block 168 and flashes LED 3 for 100 milliseconds, and then reenters decision block 166. Self-testing can be accomplished by scratching membrane 6 (FIG. 1) vibration sensor 30 during the 15 second duration of the test mode in order to cause LED 13 to flash in block 168, proving the operability of vibration sensor 30.

Referring to FIG. 9E, after a back and forth sweeping pattern of the illumination by light emitting diodes 1–5, different than their sweeping pattern of illumination for initiation of the test mode, to indicate that bark limiter 1 is about to enter its OFF mode, the program then goes to block 161 and causes LED D-3 to flash a number of times equal to the cumulative count in the bark counter to indicate how many stimulation episodes have occurred and resulted in incrementing the stimulation counter referred to in block 57A in FIG. 9B.

While the invention has been described with reference to several particular embodiments thereof, those skilled in the art will be able to make the various modifications to the described embodiments of the invention without departing from its true spirit and scope. It is intended that all elements or steps which are insubstantially different from those recited in the claims but perform substantially the same functions, respectively, in substantially the same way to achieve the same result as what is claimed are within the scope of the invention.

For example, a tapped transformer could be utilized and part of the primary winding current could be shunted through the secondary winding, for example, by providing a tap on the primary winding and shunting the primary winding through that tap instead of through the main terminal of the primary winding. Alternatively, another winding could be provided with a stimulation level control current in the direction opposite to the direction of the main primary winding current so as to effectively cancel part of the primary winding current. Another possibility for controlling current induced into the secondary winding after the peak flyback voltage of the primary winding would be to use a relay instead of transistor Q2 to shunt current from the primary winding.

What is claimed is:

1. An electronic apparatus for training an animal, comprising:

(a) a housing supported against the animal's skin;

(b) first and second stimulus electrodes extending from a surface of the housing;

(c) a controller in the housing including output terminals producing aversive stimulus control signals;

(d) a first switch coupled to a winding to produce a burst of first current pulses in a winding in response to a first signal produced by the controller;

(e) a second switch coupled to the first switch operative to synchronously shunt predetermined trailing portions of the first current pulses away from the winding in response to a second signal produced by the controller to reduce the amount of energy delivered to the winding by the switching transistor without substantially changing a peak value of a flyback voltage across the winding, the second signal including a burst of pulses synchronous with the burst of first current pulses.

2. The electronic apparatus of claim 1 wherein the winding is the primary winding of an output transformer having a secondary winding coupled between the first and second stimulus electrodes.

3. The electronic apparatus of claim 1 including a manual switch coupled to the controller for setting various desired stimulus levels, the controller executing a program to set various values of time intervals during which predetermined portions of the first current pulses are shunted away from the winding in order to set various corresponding intensities of aversive stimulus to be applied between the first and second stimulus electrodes in accordance with the desired stimulus levels set by means of the manual switch.

4. The electronic apparatus of claim 3 wherein the controller sequentially increments values of the time intervals in response to sequential actuation of the manual switch.

5. The electronic apparatus of claim 3 wherein manual setting of the intensities is accomplished by actuating only the manual switch.

6. A collar-mounted electronic apparatus for control of barking by a dog, comprising:

(a) a housing supported by a collar for attachment to the dog's neck;

(b) first and second stimulus electrodes connected to a surface of the housing;

(c) a vibration sensor supported by the housing for detecting vibrations caused by vocalization by the dog;

(d) a controller in the housing having an input coupled to an output of the vibration sensor, the controller including output terminals producing aversive stimulus control signals in response to barking by the dog;

(e) a switching transistor coupled to a winding of an output transformer to produce a burst of first current pulses in the winding in response to a first signal produced by the controller;

(f) a shunt transistor coupled to the switching transistor operative to synchronously shunt predetermined trailing portions of the first current pulses away from the winding in response to a second signal produced by the controller to reduce the amount of energy delivered to the winding by the switching transistor without substantially changing a peak value of a flyback voltage across the winding, the second signal including a burst of pulses synchronous with the burst of first current pulses.

7. The collar-mounted electronic apparatus of claim 6 wherein the second signal synchronously turns the shunt transistor on during a trailing portion of each first current pulse after a peak of the flyback voltage produced in response to the first current pulse.

8. The collar-mounted electronic apparatus of claim 7 including a membrane switch flush with the surface of the housing and coupled to the controller, the controller sequentially setting desired stimulus intensity levels in response to sequential actuation of the membrane switch, the controller also sequentially turning on, one at a time, selected stimulus intensity indicating light emitting diodes visible through a sidewall of the housing, the controller producing a delay in a leading edge of each pulse of the second signal in accordance with the selected desired stimulus intensity level.

9. The collar-mounted electronic apparatus of claim 8 wherein the housing includes translucent material, the collar-mounted electronic apparatus including a reflector disposed within the housing behind a plurality of stimulus intensity indicating light emitting diodes to reflect and thereby intensify light emitted by the stimulus intensity indicating light emitting diodes and impinging on the housing so that light emitted by each stimulus intensity indicating light emitting diode passes through the housing and is easily visible from outside the housing.

10. The electronic apparatus of claim 6 wherein the winding is the primary winding of an output transformer having a secondary winding coupled between the first and second stimulus electrodes.

11. The electronic apparatus of claim 6 including a manual switch coupled to the controller for setting various desired stimulus levels, the controller executing a program to set various values of time intervals during which predetermined portions of the first current pulses are shunted away from the winding in order to set various corresponding intensities of aversive stimulus applied between the first and second stimulus electrodes in accordance with the desired stimulus levels set by means of the manual switch.

12. The electronic apparatus of claim 11 wherein the controller sequentially increments values of the time intervals in response to sequential actuation of the manual switch.

13. The electronic apparatus of claim 11 wherein the program is configured to cause manual setting of the intensities to be accomplished by actuating only the manual switch.

14. The electronic apparatus of claim 6 including neck motion sensing means coupled to the controller for enabling the controller to produce the first and second signals in response to a characteristic neck motion of the dog during barking.

15. The electronic apparatus of claim 14 including means in the controller for establishing a low-power sleep mode during an interval of time during which no characteristic motion of the dog's neck is detected by the neck motion sensing means.

16. The electronic apparatus of claim 6 including valid bark determination means in the controller for producing a frequency spectrum of vocalization by the dog and comparing the frequency spectrum with a predetermined valid bark frequency spectrum to determine if the vocalization constitutes a valid barking episode.

17. A method of operating an electronic apparatus to train an animal, the electronic apparatus including a housing supported against the animal's skin, first and second stimulus electrodes extending from a surface of the housing, and a controller in the housing having an input coupled to an output of the sensor, the method comprising:

(a) operating the controller to produce a first signal to control a first switch coupled to a winding to produce a burst of first current pulses in the winding; and (b) operating the controller to produce a second signal to control a second switch coupled to the first switch to synchronously shunt predetermined trailing portions of the first current pulses away from the winding to reduce the amount of energy delivered to the winding by the switching transistor without substantially changing a peak value of a flyback voltage across the winding, the second signal including a burst of pulses synchronous with the burst of first current pulses.

18. The method of claim 17 wherein step (a) includes producing the burst of first current pulses in the primary winding of an output transformer having a secondary winding coupled between the first and second stimulus electrodes.

19. The method of claim 17 including actuating a manual switch coupled to the controller to cause the controller to execute a program to set various values of time intervals during which predetermined portions of the first current pulses are shunted away from the winding in order to set various corresponding intensities of aversive stimulus applied between the first and second stimulus electrodes.

20. The method of claim 17 including operating the controller to sequentially increment values of the time intervals in response to sequential actuation of the manual switch.

21. The method of claim 17 wherein step (b) includes operating the controller to produce the second signal to control the second switch to synchronously shunt the predetermined trailing portions after corresponding peaks of the flyback voltage.

22. An electronic apparatus for training an animal, the electronic apparatus including a housing supported against the animal's skin, first and second stimulus electrodes extending from a surface of the housing, and a controller in the housing having an input coupled to an output of the sensor, the method comprising:

(a) means for operating the controller to produce a first signal to control a first switch coupled to a winding to produce a burst of first current pulses in the winding; and (b) means for operating the controller to produce a second signal to control a second switch coupled to the first switch to synchronously shunt predetermined trailing portions of the first current pulses away from the winding to reduce the amount of energy delivered to the winding by the switching transistor without substantially changing a peak value of a flyback voltage across the winding, the second signal including a burst of pulses synchronous with the burst of first current pulses.

23. The electronic apparatus of claim 22 including switch means coupled to the controller for causing the controller to execute a program to set various values of time intervals during which predetermined portions of the first current pulses are shunted away from the winding in order to set various corresponding intensities of aversive stimulus applied between the first and second stimulus electrodes.

24. The electronic apparatus of claim 22 including means for operating the controller to produce the second signal to control the second switch to synchronously shunt the predetermined trailing portions after corresponding peaks of the flyback voltage.

* * * * *